US010266310B2

(12) United States Patent
Li et al.

(10) Patent No.: US 10,266,310 B2
(45) Date of Patent: Apr. 23, 2019

(54) CHIRAL STRUCTURES WITH ADJUSTABLE AUXETIC EFFECTS

(71) Applicant: The University of New Hampshire, Durham, NH (US)

(72) Inventors: Yaning Li, Durham, NH (US); Yunyao Jiang, Durham, NH (US)

(73) Assignee: University of New Hampshire, Durham, NH (US)

(*) Notice: Subject to any disclaimer, the term of this patent is extended or adjusted under 35 U.S.C. 154(b) by 47 days.

(21) Appl. No.: 15/248,793

(22) Filed: Aug. 26, 2016

(65) Prior Publication Data

US 2017/0057704 A1    Mar. 2, 2017

Related U.S. Application Data

(60) Provisional application No. 62/210,128, filed on Aug. 26, 2015.

(51) Int. Cl.
   *B65D 39/12* (2006.01)
   *F16B 7/04* (2006.01)

(52) U.S. Cl.
   CPC ............ *B65D 39/12* (2013.01); *F16B 7/0426* (2013.01)

(58) Field of Classification Search
   CPC .................................. B65D 39/12; F16B 7/04
   USPC ........................................................ 428/212
   See application file for complete search history.

(56) References Cited

U.S. PATENT DOCUMENTS

| 8,652,602 | B1* | 2/2014 | Dolla ................... | B29C 44/357 |
|           |     |        |                         | 428/36.1 |
| 2007/0162112 | A1* | 7/2007 | Burriesci ............. | A61F 2/2448 |
|           |     |        |                         | 623/2.36 |
| 2010/0029796 | A1* | 2/2010 | Alderson .............. | B29C 44/357 |
|           |     |        |                         | 521/143 |
| 2011/0029063 | A1 | 2/2011 | Ma et al. |
| 2011/0282452 | A1 | 11/2011 | Koerner et al. |
| 2012/0147351 | A1 | 6/2012 | Jak et al. |
| 2013/0344601 | A1 | 12/2013 | Soman et al. |
| 2014/0205795 | A1 | 7/2014 | Hu |

OTHER PUBLICATIONS

International Search Report and Written Opinion issued in International Patent Application No. PCT/US2016/048998 dated Jan. 19, 2017 (12 pages).

* cited by examiner

*Primary Examiner* — Tahseen Khan
(74) *Attorney, Agent, or Firm* — Grossman, Tucker, Perreault & Pfleger, PLLC

(57) ABSTRACT

An auxetic structure consistent with the present disclosure may include a core cell, capable of rotation, including a plurality of first rib sections, and a plurality of second rib sections. The first rib sections may be transverse to a longitudinal axis of the auxetic structure and at least one of the first rib sections may extend from the core cell. The second rib sections may be transverse to a transverse axis of the auxetic structure and at least one of the second rib sections may extend from the core cell.

18 Claims, 35 Drawing Sheets

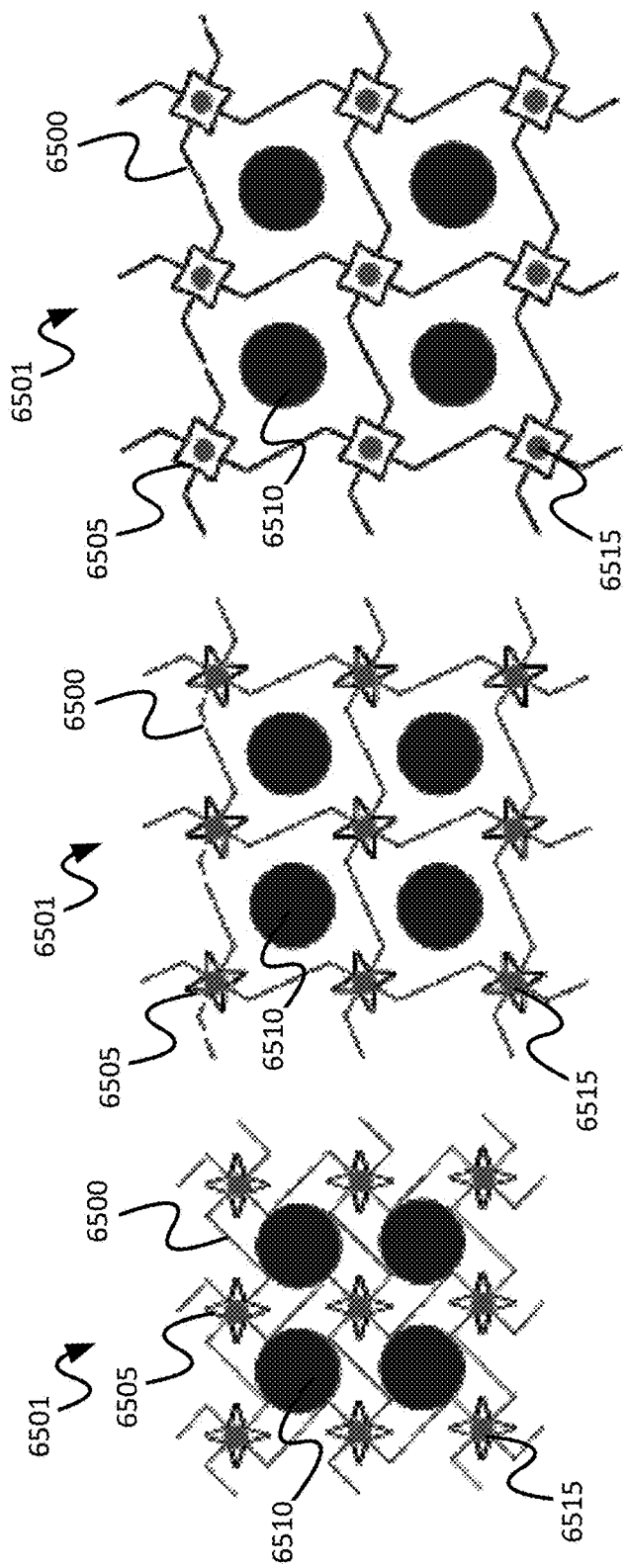

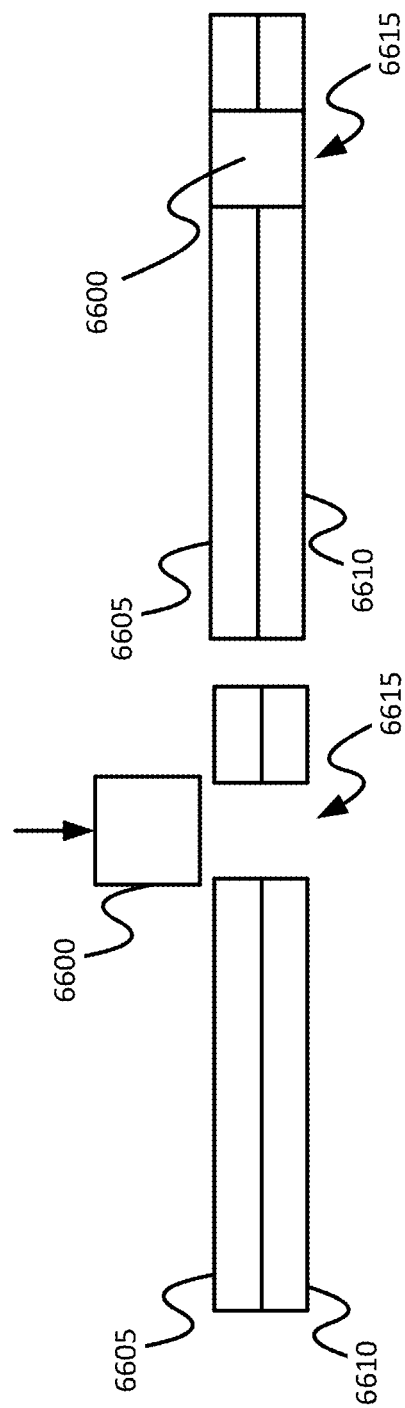

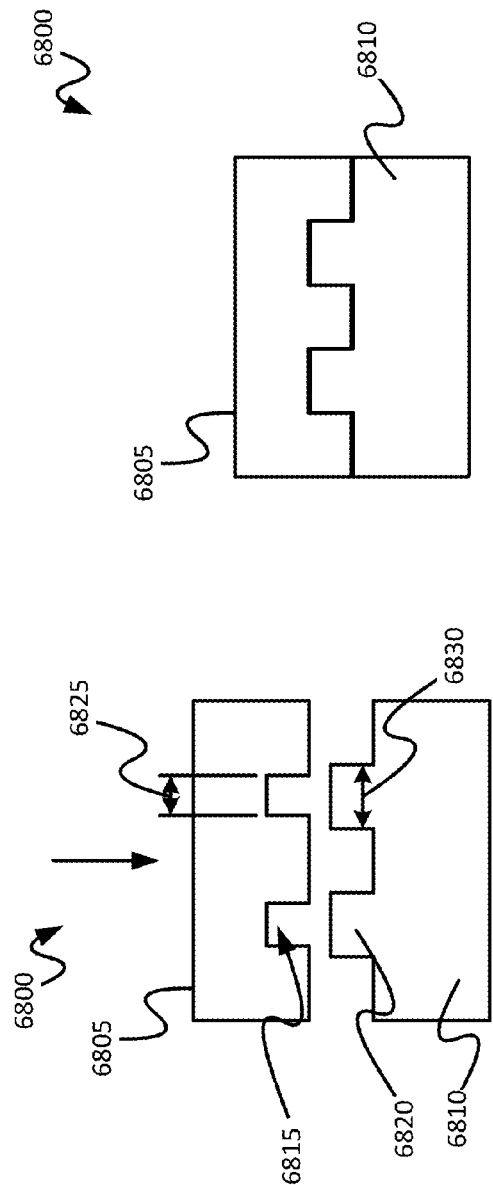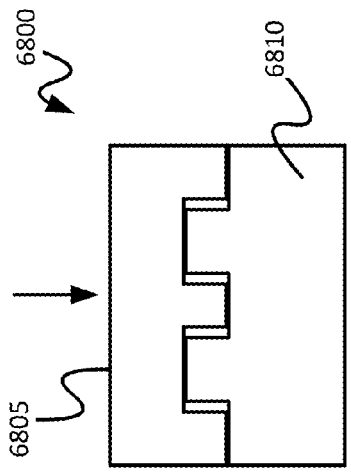

CHIRAL STRUCTURES WITH ADJUSTABLE AUXETIC EFFECTS

CROSS-REFERENCE TO RELATED APPLICATIONS

This application claims the benefit of U.S. Provisional Patent Application Ser. No. 62/210,128 filed on Aug. 26, 2015, which is fully incorporated herein in its entirety by reference.

TECHNICAL FIELD

The present disclosure relates to auxetic materials and more particularly to adjustable auxetic structures having a core cell or hierarchal structure.

BACKGROUND INFORMATION

A material under tension or compression undergoes a change in both length and width. For example, for a tensile load, the ratio of the relative contraction strain (normal to the applied tensile force) to the relative extension strain (parallel to the applied force) is generally known as the Poisson's ratio. When a tensile force is applied to a material having a positive Poisson's ratio, the width of the material tends to decrease as the length of the material increases. Conversely, when a compressive force is applied to a material having a positive Poisson's ratio, the width of the material tends to increase as the length of the material decreases.

However, not all materials have a positive Poisson's ratio. Materials having a negative Poisson's ratio are commonly referred to as auxetic materials. For example, when a tensile force is applied to an auxetic material, the width of the material tends to increase as the length of the material increases. Conversely, when a compressive force is applied to an auxetic material, the width of the material tends to decrease as the length of the material decreases.

An auxetic material may exhibit a negative Poisson's ratio for only a portion of the total deformation of the material. For example, the Poisson's ratio may initially be negative; however, continued deformation of the auxetic material may result in the Poisson's ratio transitioning to a positive value. This may be the result of the internal structure of the auxetic material buckling. Accordingly, designers seeking to exploit the properties of an auxetic material are constrained, at least, by the transition point at which the Poisson's ratio becomes positive.

SUMMARY

One embodiment of the present disclosure relates to an auxetic structure having a longitudinal and transverse axis may include a core cell. The auxetic structure may also include a plurality of first rib sections transverse to the longitudinal axis of the auxetic structure. At least one of the first rib sections may extend from the core cell. The auxetic structure may further include a plurality of second rib sections transverse to said transverse axis of the auxetic structure. At least one of the second rib sections may extend from the core cell.

A second embodiment of an auxetic material having a longitudinal and transverse axis may include at least four auxetic structures. The auxetic structures may collectively define at least one chiral cell within the auxetic material. Each of the at least four auxetic structures may include a core cell. A plurality of first rib sections may extend from the core cell. The first rib sections may be transverse to the longitudinal axis of the auxetic structure. A plurality of second rib sections may also extend from the core cell. The second rib sections may be transverse to the transverse axis of the auxetic structure. The plurality of first rib sections may define at least a portion of a first rib that extends along the longitudinal axis of the auxetic structure and the plurality of second rib sections may define at least a portion of a second rib that extends along the transverse axis of the auxetic structure.

A third embodiment of an auxetic structure having a longitudinal and transverse axis may include a core cell having at least a first concave region and a second concave region. The first concave region may be opposite the second concave region. A plurality of first rib sections may extend from the core cell. The first rib sections may be transverse to the longitudinal axis of the auxetic structure. A plurality of second rib sections may also extend from the core cell. The second rib sections may be transverse to the transverse axis of the auxetic structure.

BRIEF DESCRIPTION OF THE DRAWINGS

These and other features and advantages will be better understood by reading the following detailed description, taken together with the drawings, wherein:

FIG. 65A shows an embodiment of a drug delivery system including an auxetic material, consistent with embodiments of the present disclosure.

FIG. 65B shows an example of the drug delivery system of FIG. 65A at a first state, consistent with embodiments of the present disclosure.

FIG. 65C shows an example of the drug delivery system of FIG. 65A at a second state, consistent with embodiments of the present disclosure.

FIG. 66A shows a cross-section of an example of a tool-less fastener including an auxetic material, consistent with embodiments of the present disclosure.

FIG. 66B shows a cross-section of an example the tool-less fastener of FIG. 66A coupling at least two materials together, consistent with embodiments of the present disclosure.

FIG. 68A shows a cross-section of an example of a fastening system including an auxetic material, consistent with embodiments of the present disclosure.

FIG. 68B shows a cross-section of an example of the fastening system of FIG. 68A being coupled together, consistent with embodiments of the present disclosure.

FIG. 68C shows a cross-section of an example of the fastening system of FIG. 68B being exposed to a compressive force, consistent with embodiments of the present disclosure.

DETAILED DESCRIPTION OF PREFERRED EMBODIMENTS

The present disclosure is generally directed to materials having a negative Poisson's ratio (or auxetic materials). The auxetic materials disclosed herein preferably include a plurality of longitudinal and transverse "zig-zag" shaped ribs. Each of the ribs may connect to a core cell that alters, for example, one or more of the Poisson's ratio, the overall stiffness of the auxetic material, or the stages of the deformation. Reference to a core cell is reference to a structure that upon imposition of a mechanical force, such as a tensile or compression force, is capable of responding in rotation. Accordingly, the core cell may preferably include a contiguous outer perimeter that defines a bounded space, but as may be appreciated herein, a contiguous outer perimeter is not necessary for the rotational response. The "zig-zag" shaped ribs may also be modified such that the linear sections of the ribs also include a "zig-zag" portion. Such a hierarchal configuration may also alter, for example, one or more of the Poisson's ratio, the overall stiffness of the auxetic material, or the stages of the deformation. Accordingly, pursuant to the present disclosure, a designer seeking to exploit the properties of an auxetic material may tailor the structure of the auxetic material to meet his/her needs.

Figure 1:
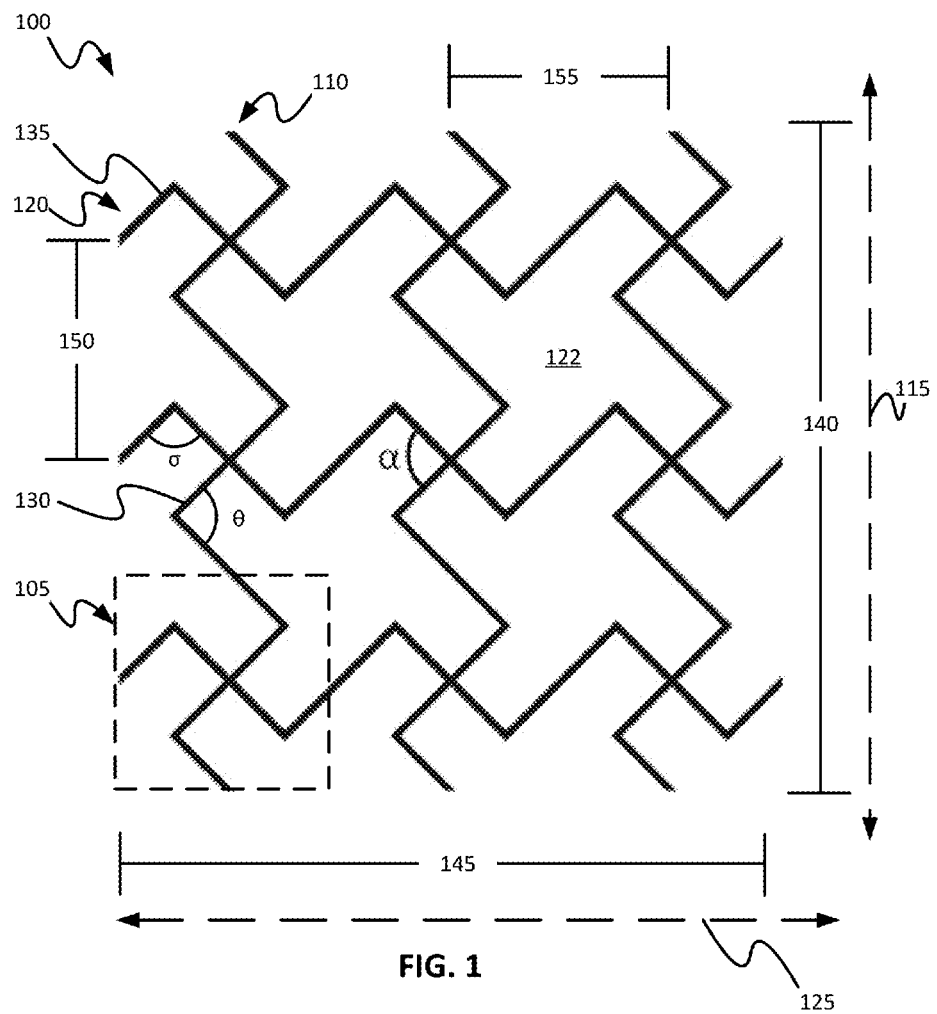
FIG. 1 is an example of an auxetic material, consistent with embodiments of the present disclosure.

FIG. 1 shows an auxetic material 100 having a plurality of auxetic structures 105 (one of which is enclosed within broken lines for clarity of illustration). Each auxetic structure 105 is defined by at least one first rib 110 extending along a longitudinal axis 115 and at least one second rib 120 extending along a transverse axis 125. As shown, the first rib 110 is transverse to the second rib 120 such that an intersection angle α is formed between the first rib 110 and the second rib 120. The intersection angle α may be between 10° and 170°. More particularly, the intersection angle α may be between 80° and 110°. Even more particularly, in some embodiments, the intersection angle α may be 90°. However, when the intersection angle α is not equal to 90°, the auxetic material 100 may exhibit anisotropic properties along the longitudinal axis 115 and/or the transverse axis 125. As shown, the auxetic material 100 includes a plurality of first ribs 110 and a plurality of second ribs 120 such that the plurality of first ribs 110 and the plurality of second ribs 120 collectively define a chiral cell 122. In some embodiments, the auxetic structure 105 and/or chiral cell 122 are not symmetrical about any axis. Additionally, or alternatively, the auxetic structure 105 and/or chiral cell 122 may not be superimposable on its mirror image.

As shown, each of the auxetic structures 105 include a plurality of first rib sections 130 that define at least a portion of the first rib 110 and a plurality of second rib sections 135 that define at least a portion of the second rib 120. As shown, the first rib sections 130 may be transverse to the longitudinal axis 115 such that the first rib 110 has a "zig-zag" shaped portion. In other words, adjoining first rib sections 130 define a first adjoining angle θ. The first adjoining angle θ may be between 10° and 90°. More particularly, the first adjoining angle θ may be between 45° and 90°. Even more particularly, in some embodiments, the first adjoining angle θ may be 90°. As is also shown, the second rib sections 135 may be transverse to the transverse axis 125 such that the second rib 120 has a "zig-zag" shaped portion. In other words, adjoining second rib sections 135 define a second adjoining angle σ. The second adjoining angle σ may be between 10° and 90°. More particularly, the second adjoining angle σ may be between 45° and 90°. Even more particularly, in some embodiments, the second adjoining angle σ may be 90°.

When a tensile force is applied parallel to the longitudinal axis 115, an overall length 140 of the auxetic material 100 increases as the auxetic material 100 begins to deform (e.g., lengthen) due to a longitudinal separation distance 150 between the auxetic structures 105 increasing. As the overall length 140 increases, the first adjoining angle θ increases causing the first rib 110 to straighten. As the first adjoining angle θ increases, a force is exerted on the second rib sections 135 that causes the second adjoining angle σ to increase. As the second adjoining angle σ increases, the second rib 120 begins to straighten and an overall width 145 of the auxetic material 100 begins to increase due to a transverse separation distance 155 between auxetic structures 105 increasing. The straightening of the first rib 110 and/or the second rib 120 may generally be described as causing a rotation of the auxetic structures 105 and/or a rotation of the chiral cell 122.

A rate of change for the first adjoining angle θ may be different from a rate of change for the second adjoining angle σ. For example, the magnitude of the rate of change for the first adjoining angle θ may be greater than the magnitude of the rate of change for the second adjoining angle σ. Therefore, the first rib 110 may become substantially linear before the second rib 120.

Figure 2:
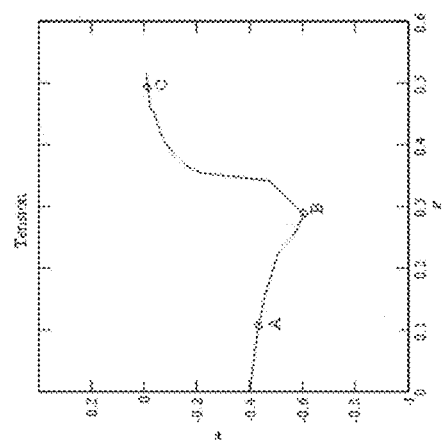
FIG. 2 is a plot of the Poison's ratio against tensile strain for the auxetic material of FIG. 1, consistent with embodiments of the present disclosure.
Figure 3C:
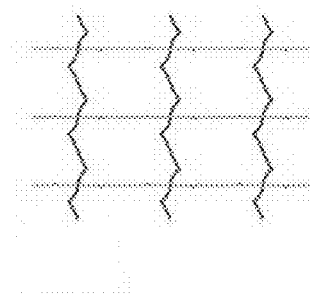
FIG. 3C is a representation of the deformation of the auxetic material of FIG. 1 at point C on the plot of FIG. 2, consistent with embodiments of the present disclosure.
Figure 3B:
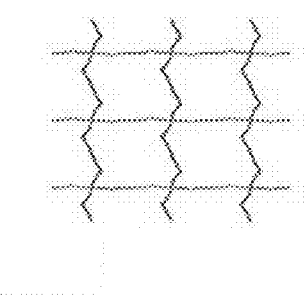
FIG. 3B is a representation of the deformation of the auxetic material of FIG. 1 at point B on the plot of FIG. 2, consistent with embodiments of the present disclosure.
Figure 3A:
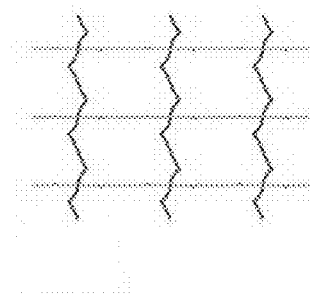
FIG. 3A is a representation of the deformation of the auxetic material of FIG. 1 at point A on the plot of FIG. 2, consistent with embodiments of the present disclosure.

When the tensile force is applied, the rotation of the auxetic structures 105 results in the auxetic material 100 having a negative Poisson's ratio for at least a portion of the deformation of the auxetic material 100. FIG. 2 plots the Poisson's ratio for the auxetic material 100 of FIG. 1 against tensile strain. As shown in the plot of FIG. 2, the Poisson's ratio initially decreases (becoming more negative) from a value of approximately −0.4 until reaching a minimum value of approximately −0.6. Then the Poisson's ratio begins to increase (becoming less negative), eventually approaching a value of approximately zero at point C. In some instances, the Poisson's ratio may asymptotically approach zero. Points A, B, and C on the plot of FIG. 2 may generally correspond to the deformation of the auxetic material 100 as represented in FIGS. 3A, 3B, and 3C, respectively.

Referring again to FIG. 1, when a compressive force is applied parallel to the longitudinal axis 115 of the auxetic material 100, the overall length 140 of the auxetic material 100 begins to decrease. As the overall length 140 decreases, the adjoining angle θ decreases such that the longitudinal separation distance 150 between the auxetic structures 105 decreases and the transverse separation distance 155 between auxetic structures 105 decreases. Therefore, as the overall length 140 decreases, the overall width 145 of the auxetic material 100 also decreases, resulting in a negative Poisson's ratio. As a result of the change in both the longitudinal separation distance 150 and the transverse separation distance 155, the auxetic structures 105 and/or the chiral cell 122 may generally be described as rotating when compressed.

Figure 4:
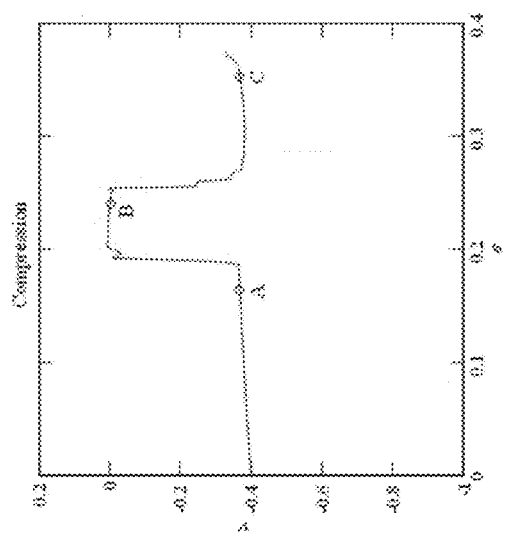
FIG. 4 is a plot of the Poison's ratio against compressive strain for the auxetic material of FIG. 1, consistent with embodiments of the present disclosure.
Figure 5C:
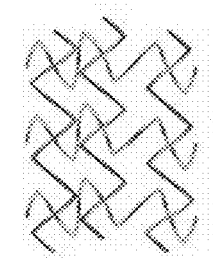
FIG. 5C is a representation of the deformation of the auxetic material of FIG. 1 at point C on the plot of FIG. 4, consistent with embodiments of the present disclosure.
Figure 5B:
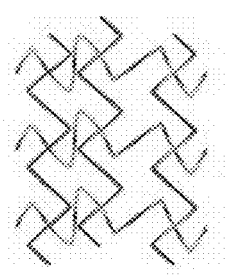
FIG. 5B is a representation of the deformation of the auxetic material of FIG. 1 at point B on the plot of FIG. 4, consistent with embodiments of the present disclosure.
Figure 5A:
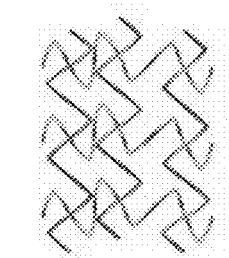
FIG. 5A is a representation of the deformation of the auxetic material of FIG. 1 at point A on the plot of FIG. 4, consistent with embodiments of the present disclosure.

FIG. 4 plots the Poisson's ratio for the auxetic material 100 of FIG. 1 against compressive strain. As shown in the plot of FIG. 4, the Poisson's ratio initially increases (becoming less negative) from a value of approximately −0.4 until reaching a maximum value of approximately 0. Then, the Poisson's ratio begins to decrease (becoming more negative), eventually approaching another minimum value of approximately −0.4 at or before point C. Points A, B, and C on the plot of FIG. 4 may generally correspond to the deformation of the auxetic material 100 as represented in FIGS. 5A, 5B, and 5C, respectively.

Figure 6A:
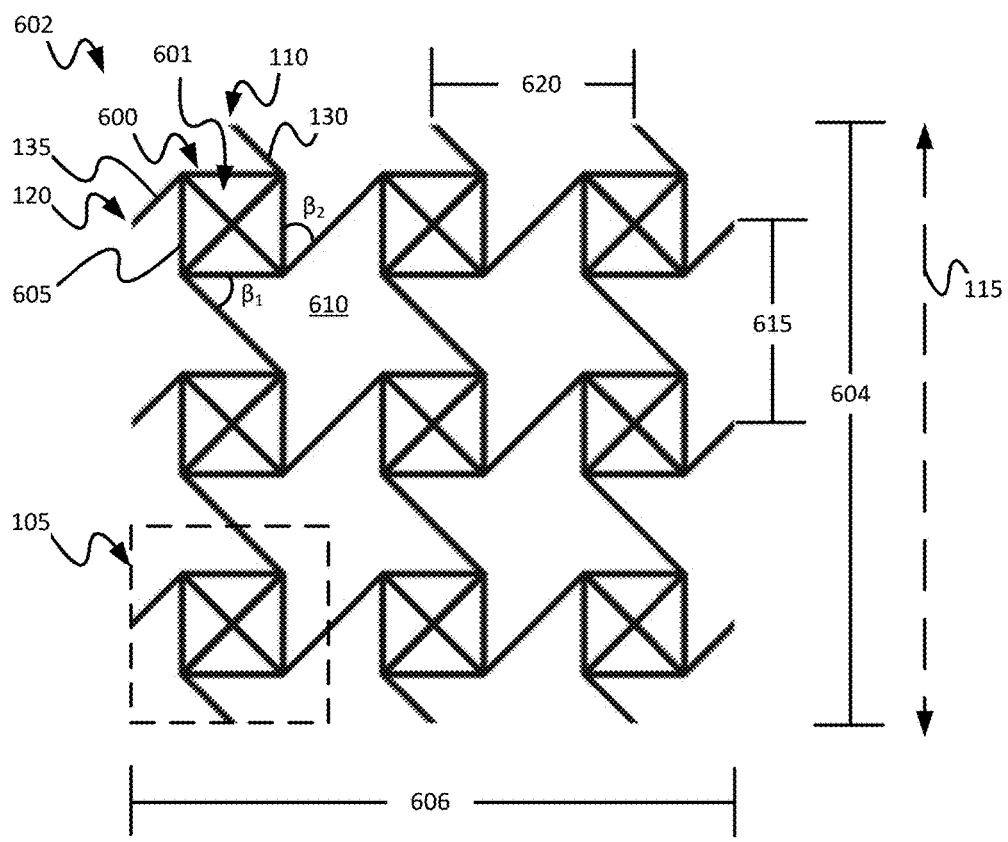
FIG. 6A shows an embodiment of the auxetic material of FIG. 1 having a square-shaped contiguous core cell, consistent with embodiments of the present disclosure.
Figure 6B:
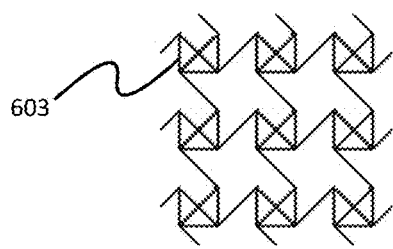
FIG. 6B shows an embodiment of the auxetic material of FIG. 6A have a non-contiguous core cell, consistent with embodiments of the present disclosure.

As shown in FIG. 6A, an auxetic material herein may preferably include one or more square-shaped contiguous core cells 600 which defines a bounded space 601 to form an auxetic material 602. However, as noted above, the core cells need not have a contiguous outer perimeter as illustrated at 600, but it is only preferred. For example, FIG. 6B shows one example of a core cell 603 that is not a contiguous core cell (i.e., not having a contiguous outer perimeter). Returning to FIG. 6A, as shown, the square-shaped contiguous core cell 600 preferably has a generally square or rectangular shape. Therefore, the preferred square-shaped contiguous core cell 600 may be defined by four core cell sections 605. The core cell sections 605 which preferably define the contiguous perimeter on the core cell may extend between the first rib 110 and the second rib 120. As a result, one or more first and second rib sections 130,135 may extend from the square-shaped contiguous core cell 600. In other words, each core cell section 605 may extend between the vertices defined by adjoining first and second rib sections 130,135. Therefore, in some instances, one or more of the first rib sections 130 and/or one or more of the second rib sections 135 may be enclosed within the square-shaped contiguous core cell 600.

As shown, a plurality of first ribs 110, a plurality of second ribs 120, and at least four square-shaped contiguous core cells 600 collectively define a chiral cell 610. A plurality of core section angles $\beta_1,\beta_2$ are formed between a respective rib section 130,135 and a respective one of the core cell sections 605. In some instances, the plurality of core section angles $\beta_1,\beta_2$ may be the same. For example, the core section angles $\beta_1,\beta_2$ may be between 1° and 45°. More particularly the core section angles $\beta_1,\beta_2$ may be between 30° and 45°. Even more particularly, in some embodiments, the core section angles $\beta_1,\beta_2$ may be 45°. In other instances, the plurality of core section angles $\beta_1,\beta_2$ may be different from each other.

When the auxetic material 602 is exposed to a tensile force parallel to the longitudinal axis 115, the auxetic structure 105 rotates. As the auxetic structure 105 rotates, the square-shaped contiguous core cell 600 and the chiral cell 610 may also be described as rotating. As may be appreciated, rotation will still occur in the event that, e.g., one of the core cell sections 605 is not present. The rotation of the square-shaped contiguous core cell 600 causes at least one of the core section angles $\beta_1,\beta_2$ to increase, resulting in the first rib 110 and the second rib 120 straightening. As the first rib 110 and the second rib 120 begin to straighten an overall length 604 of the auxetic material 602 increases and an overall width 606 of the auxetic material 602 increases. In other words, a longitudinal separation distance 615 between the auxetic structures 105 increases and a transverse separation distance 620 between auxetic structures 105 also increases. After the first rib 110 becomes substantially linear in the direction of tensile force the continued deformation of the auxetic material 602 results in the first ribs 110 lengthening/deforming and the square-shaped contiguous core cell 600 lengthening/deforming. However, due to the rotation of the auxetic structures 105 and the square-shaped contiguous core cell 600, the auxetic material 602 has a negative Poisson's ratio for at least a portion of the deformation.

Prior to deformation, for example, the longitudinal separation distance 615 may measure approximately between 50 nm and 50 mm and the transverse separation distance 620 may measure approximately between 50 nm and 50 mm. In one example, prior to deformation, the longitudinal separation distance 615 measured 30 mm and the transverse separation distance 620 measured 30 mm.

Figure 7:
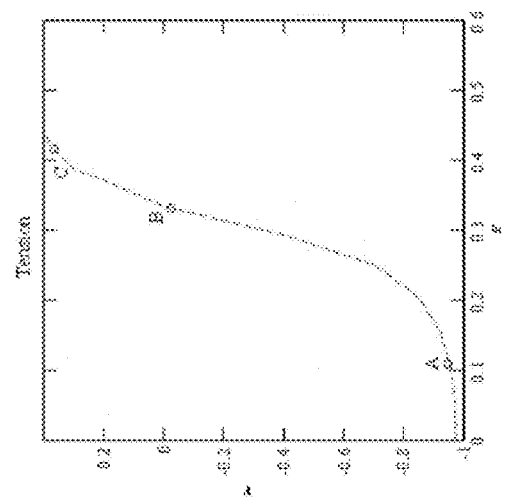
FIG. 7 is a plot of the Poison's ratio against tensile strain for the auxetic material of FIG. 6A, consistent with embodiments of the present disclosure.

FIG. 7 plots the Poisson's ratio for the auxetic material 602 of FIG. 6A against tensile strain. As shown in the plot of FIG. 7, the Poisson's ratio progressively increases (becoming less negative) from a value of approximately −1.0 between points A and C, eventually becoming positive between points B and C. Points A, B, and C on the plot of FIG. 7 may generally correspond to the deformation of the auxetic material 602 as represented in FIGS. 8A, 8B, and 8C, respectively.

Figure 9:
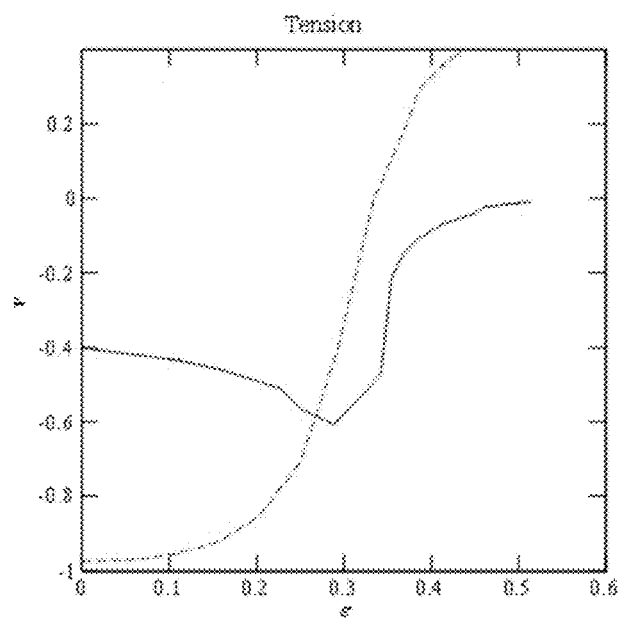
FIG. 9 is a plot of the Poison's ratio against tensile strain for the auxetic materials of FIGS. 1 and 6A, consistent with embodiments of the present disclosure.

The plot of FIG. 9 compares the Poisson's ratio against tensile strain for both of the auxetic material 100 and the auxetic material 602. The auxetic material 100 is illustrated as the solid line and the auxetic material 602 is illustrated as the broken line. As shown, the deformation of the auxetic material 100 can be generally separated into three stages: (1) between about 0% and 30% deformation, the Poisson's ratio decreases from −0.4 to −0.6 due to the rotation of the auxetic structures 105; (2) between about 30% and 45% deformation, the Poisson's ratio increases from −0.6 to 0 due to the elongation of the first ribs 110; and (3) for deformations larger than 45%, the Poisson's ratio is substantially 0 due to the straightening of the first ribs 110. In contrast, the deformation of the auxetic material 602 can generally be separated into two stages: (1) between about 0 to 20% deformation the Poisson's ratio remains approximately −1, with a slight increase due to the elongation of the first ribs 110 and (2) at deformations larger than 20%, the Poisson's ratio increases from approximately −1 to a positive value due to the straightening of the first ribs 110. In other words, the plot of FIG. 9 illustrates that the Poisson's ratio for the auxetic material 602 is initially more negative for a given tensile strain value than the auxetic material 100. However, for both the auxetic material 100 and the auxetic material 602 a negative Poisson's ratio is preserved at least until approximately 30% deformation.

Figure 10:
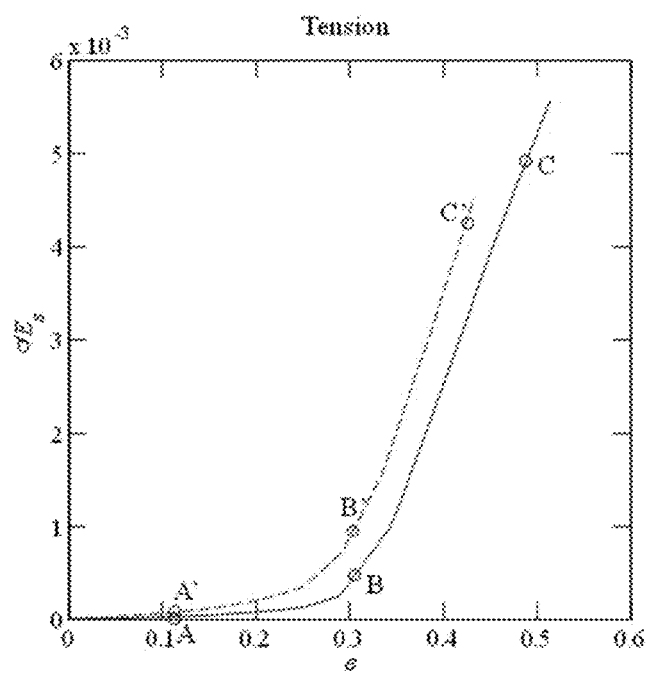
FIG. 10 is a plot of the non-dimensional stress against tensile strain for the auxetic materials of FIGS. 1 and 6A, consistent with embodiments of the present disclosure.

The plot of FIG. 10 plots a change in non-dimensional stress (e.g., the overall stress on a respective auxetic structure 105 over the Young's modulus of the first and second ribs 110, 120 Es) against tensile strain for both the auxetic material 100 and the auxetic material 602. The auxetic material 100 is illustrated by the solid line and the auxetic material 602 is illustrated by the broken line. Both the auxetic material 100 and the auxetic material 602 exhibit a hardening stage after the first rib 110 is substantially linear. However, by including one or more square-shaped contiguous core cells 600, the auxetic material 602 becomes approximately three-times stiffer than the auxetic material 100 (e.g., the slope of the stress-strain curve for the auxetic material 602 is relatively greater than the slope of the stress-strain curve for the auxetic material 100). Stated another way, in the case where auxetic material 100 and auxetic material 602 are composed of the same material and dimensions, auxetic material 602 will indicate the higher elastic modulus due to its structure.

Figure 8C:
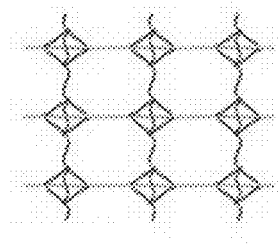
FIG. 8C is a representation of the deformation of the auxetic material of FIG. 6A at point C on the plot of FIG. 7, consistent with embodiments of the present disclosure.
Figure 8B:
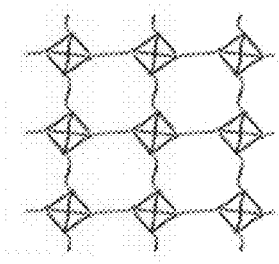
FIG. 8B is a representation of the deformation of the auxetic material of FIG. 6A at point B on the plot of FIG. 7, consistent with embodiments of the present disclosure.
Figure 8A:
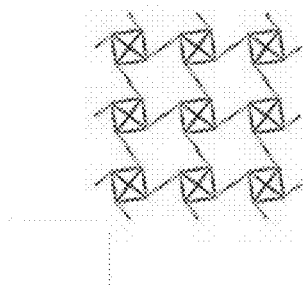
FIG. 8A is a representation of the deformation of the auxetic material of FIG. 6A at point A on the plot of FIG. 7, consistent with embodiments of the present disclosure.

Points A, B, and C may generally correspond to the deformation of the auxetic material 100 as represented in FIGS. 3A, 3B, and 3C, respectively, and points A', B', and C' may generally correspond to the deformation of the auxetic material 602 as represented in FIGS. 8A, 8B, and 8C, respectively.

Referring again to FIG. 6A, when a compressive force is applied to parallel to the longitudinal axis 115 of the auxetic material 602, the overall length 604 of the auxetic material 602 begins to decrease. As the overall length 604 decreases, the core section angle $\beta_1$ decreases such that the longitudinal separation distance 615 between the auxetic structures 105 decreases and the transverse separation distance 620 between auxetic structures 105 also decreases. Therefore, for at least a portion of the total deformation, as the overall length 604 decreases, the overall width 606 of the auxetic material 602 also decreases, resulting in a negative Poisson's ratio. As a result of the change in both the longitudinal separation distance 615 and the transverse separation distance 620, the auxetic structures 105, the square-shaped contiguous core cell 600, and/or the chiral cell 610 may generally be described as rotating when compressed.

Figure 11:
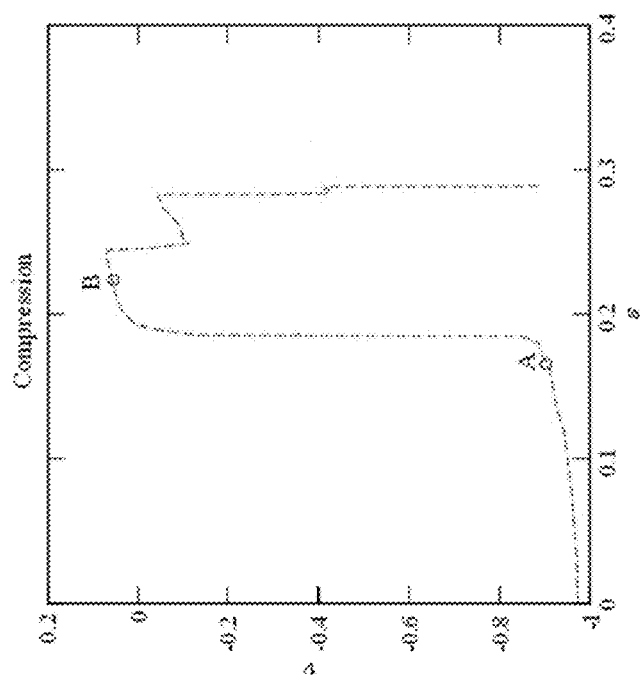
FIG. 11 is a plot of the Poison's ratio against compressive strain for the auxetic material of FIG. 6A, consistent with embodiments of the present disclosure.
Figure 12B:
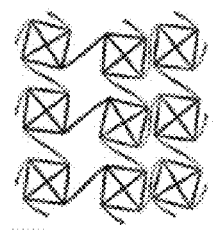
FIG. 12B is a representation of the deformation of the auxetic material of FIG. 6A at point B on the plot of FIG. 11, consistent with embodiments of the present disclosure.
Figure 12A:
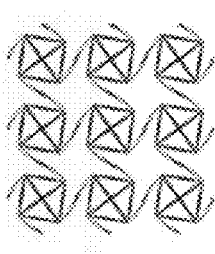
FIG. 12A is a representation of the deformation of the auxetic material of FIG. 6A at point A on the plot of FIG. 11, consistent with embodiments of the present disclosure.

The plot of FIG. 11 plots the Poisson's ratio for the auxetic material 602 against compressive strain. As shown in the plot of FIG. 11, the Poisson's ratio initially increases (becoming less negative) from a value of approximately −1.0 until reaching a maximum value of approximately 0.1. Then the Poisson's ratio begins to generally decrease and become increasingly negative. Points A and B on the plot of FIG. 11 may generally correspond to the deformation of the auxetic material 602 as represented in FIGS. 12A and 12B, respectively. As shown, in FIGS. 12A and 12B the deformation of the auxetic material 602 may not be uniform in compression due to, for example, local instabilities within the auxetic material 602.

Figure 13:
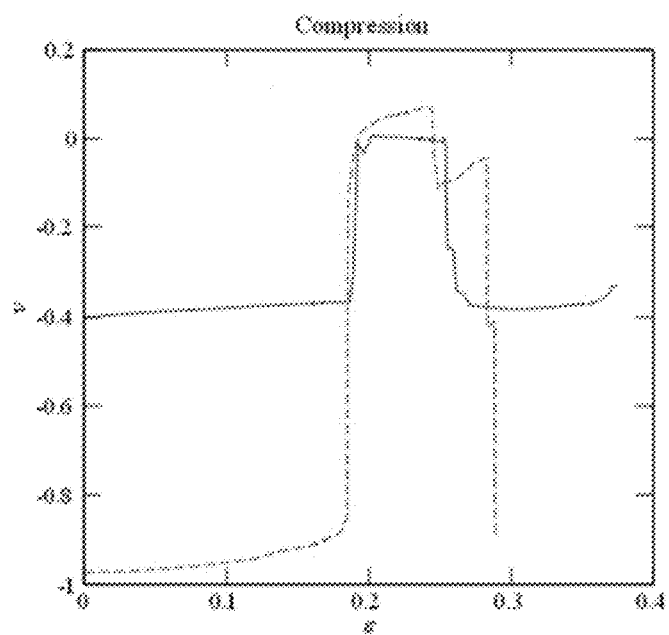
FIG. 13 is a plot of the Poison's ratio against compressive strain for the auxetic materials of FIGS. 1 and 6A, consistent with embodiments of the present disclosure.

The plot of FIG. 13 compares the Poisson's ratio for both the auxetic material 100 and the auxetic material 602 against a compressive strain. The auxetic material 100 is illustrated as the solid line and the auxetic material 602 is illustrated as the broken line. As shown, for both the auxetic material 100 and the auxetic material 602, for strain values up to approximately 20% deformation, the Poisson ratio remains substantially constant. However, the auxetic material 602 has an initial Poisson's ratio of approximately −1 while the auxetic material 100 has an initial Poisson's ratio of approximately −0.4. Then, for both the auxetic material 100 and the auxetic material 602, with continued deformation, a portion of the chiral cells 122 or the chiral cells 610 collapse and/or lose stability so that the Poisson's ratio increases to a value of zero or greater. Reference to collapse/lose stability means that, in FIG. 1, at least a portion of the first rib 110 begins to contact at least a portion the second rib 120 and, in FIG. 6A, at least a portion of the first rib 110 begins to contact at least a portion of the core cell section 605. However, when the chiral cells 122 and the chiral cells 610 fully collapse, the Poisson's ratio returns to a negative value. Reference to fully collapse means that, in FIG. 1, the first rib 110 is in contact with the second rib 120 such that there is no further densification of the auxetic material 100 and, in FIG. 6A, the first rib 110 contacts the core cell section 605 such that there is no further densification of the auxetic material 602.

Figure 14:
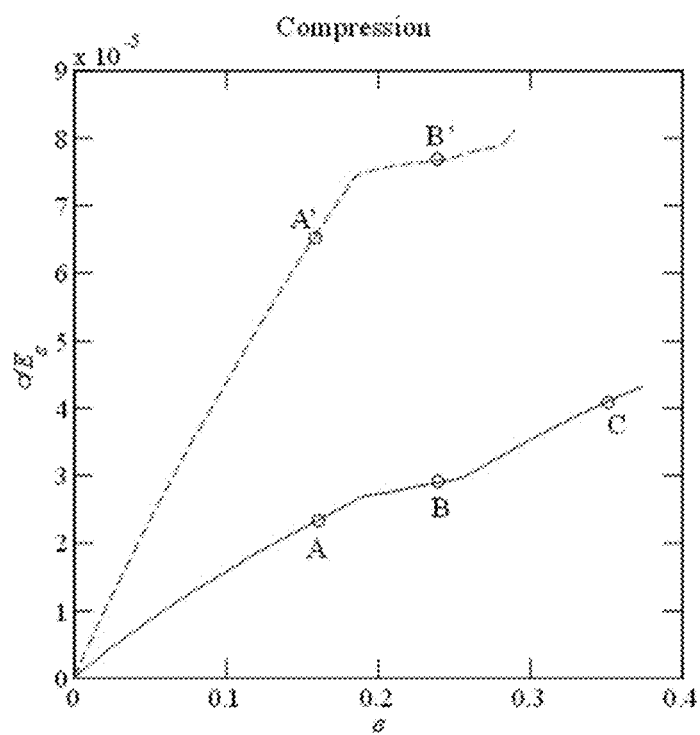
FIG. 14 is a plot of the non-dimensional stress against compressive strain for the auxetic materials of FIGS. 1 and 6A, consistent with embodiments of the present disclosure.

The plot of FIG. 14 plots a change in non-dimensional stress for both the auxetic material 100 and the auxetic material 602 against compressive strain. The auxetic material 100 is illustrated by the solid line and the auxetic material 602 is illustrated by the broken line. The stress-strain curve exhibits a turn point for both the auxetic material 100 and the auxetic material 602 after the first rib 110 begins to buckle. Reference to buckle means that, in FIG. 1, the first rib 110 contacts the second rib 120 and, in FIG. 6A, the first rib 110 contacts the core cell section 605. A hardening stage may occur when the auxetic material 100 or 602 begins to buckle, which is again reference to a change in the slope of the stress-strain diagram.

Points A, B, and C may generally correspond to the deformation of the auxetic material 100 as represented in FIGS. 5A, 5B, and 5C, respectively, and points A' and B' may generally correspond to the deformation of the auxetic material 602 as represented in FIGS. 12A and 12B, respectively.

Figure 15:
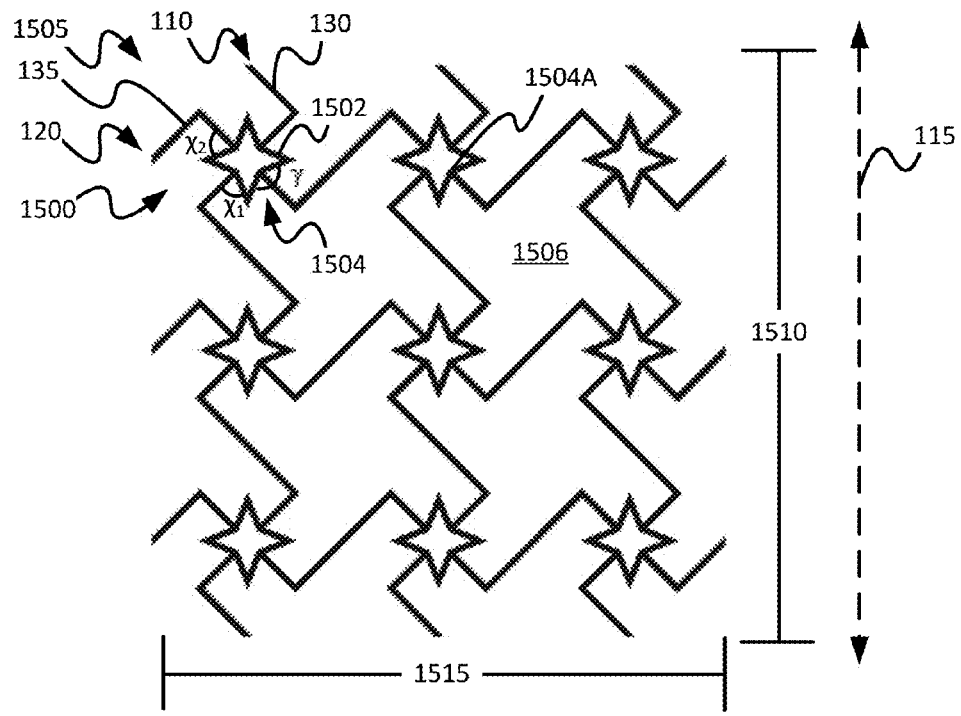
FIG. 15 shows an embodiment of the auxetic material of FIG. 1 having a star shaped contiguous core cell, consistent with embodiments of the present disclosure.

As shown in FIGS. 15-24, the auxetic material 100 of FIG. 1 may include a contiguous core cell preferably having at least one of a star shape or a bow-tie shape. A star shape may be understood as a shape having pointed sections, for example four sections, emerging from a center at relatively equal distances. A bow-tie shape may be understood as two triangles that are opposed to one another with their tapering edges joined together to provide what also may also be described as an hourglass type configuration. Accordingly, as shown in FIG. 15, the auxetic material 100 of FIG. 1 may include a star shaped contiguous core cell 1500 to form an auxetic material 1505. The star shaped contiguous core cell 1500 may be included within the first rib 110 and the second rib 120. In other words, the first and second rib sections 130,135 may not extend into or be enclosed within the star shaped contiguous core cell 1500 but one or more of the first and/or second rib sections 130,135 may extend from the star shaped contiguous core cell 1500. As shown, the first ribs 110, second ribs 120, and at least four star shaped contiguous core cells 1500 collectively define a chiral cell 1506.

The star shaped contiguous core cell 1500 may include a plurality of core cell sections 1502. As shown, the star shaped contiguous core cell 1500 may include one or more concave regions 1504. The one or more concave regions 1504 may be defined by adjoining core cell sections 1502 that extend into the star shaped contiguous core cell 1500 and define a concave angle γ. The concave angle γ may be greater than 0° and up to but not including 180°. More particularly, the concave angle γ may preferably be between 60° and 120°. Even more particularly, in some embodiments, the concave angle γ is preferably 120°. Alternatively, or additionally, the concave regions 1504 may be defined by a curvature in one or more core cell sections 1502. Regardless, at least one first rib section 130 or at least one second rib section 135 may extend from the concave region 1504, for example, from a vertex 1504A formed by the adjoining core cell sections 1502. Therefore, the first rib section 130 forms a first chiral angle $\chi_1$ with a respective core cell section 1502 and the second rib section 135 forms a second chiral angle $\chi_2$ with a respective core cell section 1502. The first and second chiral angles $\chi_1$, $\chi_2$ may be between 1° and 90°. More particularly the first and second chiral angles $\chi_1$, $\chi_2$ may be between 30° and 60°. Even more particularly, in some embodiments the first and second chiral angles $\chi_1$, $\chi_2$ may be 45°.

When a tensile force is applied parallel to the longitudinal axis 115, the auxetic material 1505 deforms and the star shaped contiguous core cell 1500 and/or the chiral cell 1506 rotate. The rotation of the star shaped contiguous core cell 1500 and the chiral cell 1506 is similar to the rotation of the auxetic structures 105 and the chiral cells 122,610 as discussed above in relation to FIGS. 1-14. Therefore, for the sake of brevity, further discussion of the rotation is omitted. As the star shaped contiguous core cell 1500 and/or the chiral cell 1506 rotate, an overall length 1510 of the auxetic material 1505 increases and an overall width 1515 of the auxetic material 1505 also increases for at least a portion of the deformation. Therefore, the Poisson's ratio is negative for at least a portion of the deformation.

When a compressive force is applied parallel to the longitudinal axis 115, the auxetic material 1505 deforms and the star shaped contiguous core cell 1500 and/or the chiral cell 1506 rotate. The rotation of the star shaped contiguous core cell 1500 and/or the chiral cell 1506 is similar to the rotation of the auxetic structures 105 and the chiral cells 122,610 as discussed above in relation to FIGS. 1-14. Therefore, for the sake of brevity, further discussion of the rotation is omitted. As the star shaped contiguous core cell 1500 and/or the chiral cell 1506 rotate, an overall length 1510 of the auxetic material 1505 decreases and an overall width 1515 of the auxetic material 1505 also decreases for at least a portion of the deformation. Therefore, the Poisson's ratio is negative for at least a portion of the deformation.

Figure 16:
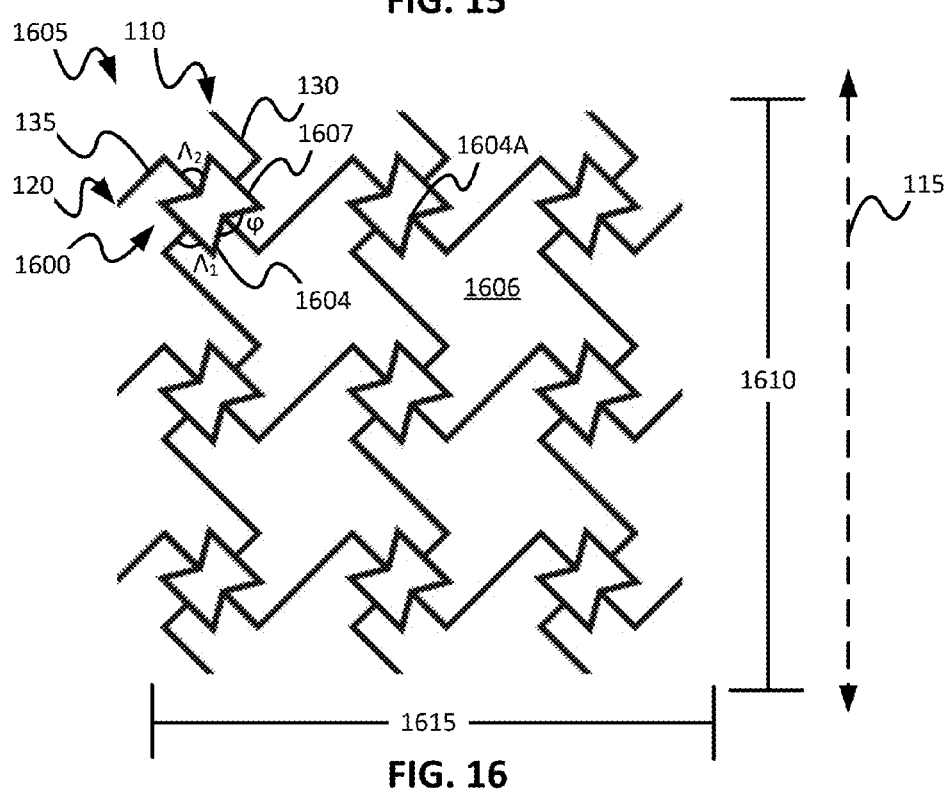
FIG. 16 shows an embodiment of the auxetic material of FIG. 1 having a bow-tie shaped contiguous core cell, consistent with embodiments of the present disclosure.

As shown in FIG. 16, the auxetic material 100 of FIG. 1 may preferably include a bow-tie shaped contiguous core cell 1600 to form an auxetic material 1605. The bow-tie shaped contiguous core cell 1600 may be included within the first rib 110 and the second rib 120. In other words, the first and second rib sections 130,135 may not extend into or be enclosed within the bow-tie shaped contiguous core cell 1600 but one or more of the first and/or second rib sections 130,135 may extend from the bow-tie shaped contiguous core cell 1600. As shown, the first ribs 110, second ribs 120, and at least four bow-tie shaped contiguous core cells 1600 collectively define a chiral cell 1606. Therefore, the first rib section 130 forms a first chiral angle $\Lambda_1$ with a respective core cell section 1502 and the second rib section 135 forms a second chiral angle $\Lambda_2$ with a respective core cell section 1502. The first chiral angle $\Lambda_1$ may be between 45° and 90°. More particularly the first chiral angle $\Lambda_1$ may be between 60° and 90°. Even more particularly, in some embodiments the first chiral angle $\Lambda_1$ may be 90°. The second chiral angle $\Lambda_2$ may be between 1° and 89°. More particularly the second chiral angle $\Lambda_2$ may be between 30° and 60°. Even more particularly, in some embodiments, the second chiral angle $\Lambda_2$ may be 45°.

The bow-tie shaped contiguous core cell 1600 may include a plurality of core cell sections that define one or more concave regions 1604 and one or more substantially planar portions 1607. The one or more concave regions 1604 may be defined by adjoining core cell sections that extend into the bow-tie shaped contiguous core cell 1600 and define a concave angle φ. The concave angle φ may be greater than 0° and up to but not including 180°. More particularly, the concave angle φ may preferably be between 60° and 120°. Even more particularly, in some embodiments, the concave angle φ is preferably 120°. Alternatively, or additionally, the concave regions 1604 may be defined by a curvature in one or more core cell sections. Regardless, at least one first rib section 130 or at least one second rib section 135 may extend from the concave region 1604, for example, from the vertex 1604A formed by adjoining core cell sections.

When a tensile force is applied parallel to the longitudinal axis 115, the auxetic material 1605 deforms and the bow-tie shaped contiguous core cell 1600 and/or the chiral cell 1606 rotate. The rotation of the bow-tie shaped contiguous core cell 1600 and/or the chiral cell 1606 is similar to the rotation of the auxetic structures 105 and the chiral cells 122,610 as discussed above in relation to FIGS. 1-14. Therefore, for the sake of brevity, further discussion of the rotation is omitted. As the bow-tie shaped contiguous core cell 1600 and/or the chiral cell 1606 rotate, an overall length 1610 of the auxetic material 1605 increases and an overall width 1615 of the auxetic material 1605 also increases for at least a portion of the deformation. Therefore, the Poisson's ratio is negative for at least a portion of the deformation.

When a compressive force is applied parallel to the longitudinal axis 115, the auxetic material 1605 deforms and the bow-tie shaped contiguous core cell 1600 and/or the chiral cell 1606 rotate. The rotation of the bow-tie shaped contiguous core cell 1600 and/or the chiral cell 1606 is similar to the rotation of the auxetic structures 105 and the chiral cells 122,610 as discussed above in relation to FIGS. 1-14. Therefore, for the sake of brevity, further discussion of the rotation omitted. As the bow-tie shaped contiguous core cell 1600 and/or the chiral cell 1606 rotate, the overall length 1610 of the auxetic material 1605 decreases and the overall width 1615 of the auxetic material 1605 also decreases for at least a portion of the deformation. Therefore, the Poisson's ratio is negative for at least a portion of the deformation.

Figure 17:
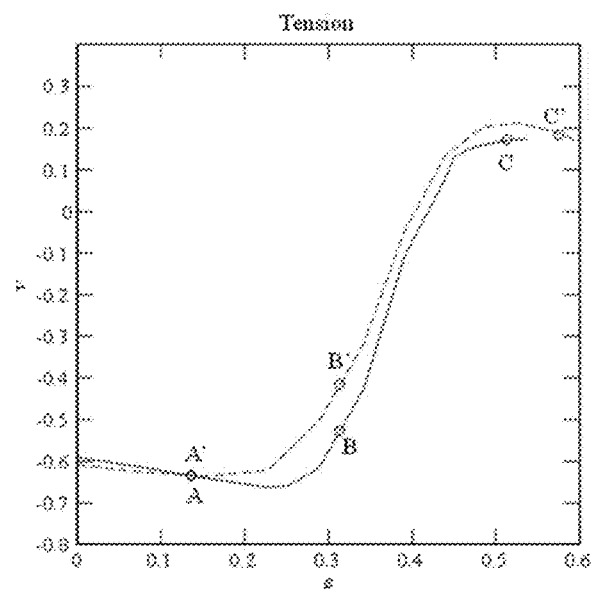
FIG. 17 is a plot of the Poison's ratio against tensile strain for the auxetic materials of FIGS. 15 and 16, consistent with embodiments of the present disclosure.
Figure 18A:
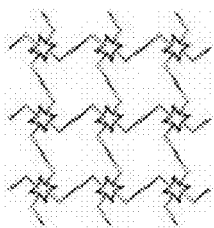
FIG. 18A is a representation of the deformation of the auxetic material of FIG. 15 at point A on the plot of FIG. 17, consistent with embodiments of the present disclosure.
Figure 18B:
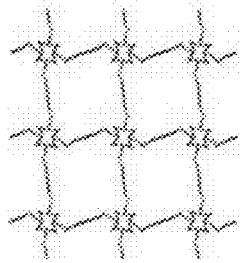
FIG. 18B is a representation of the deformation of the auxetic material of FIG. 15 at point B on the plot of FIG. 17, consistent with embodiments of the present disclosure.
Figure 18C:
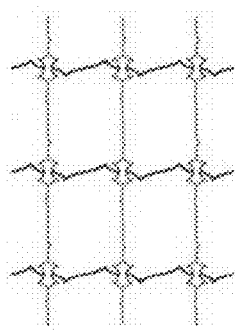
FIG. 18C is a representation of the deformation of the auxetic material of FIG. 15 at point C on the plot of FIG. 17, consistent with embodiments of the present disclosure.
Figure 19A:
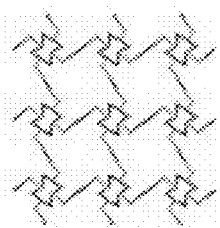
FIG. 19A is a representation of the deformation of the auxetic material of FIG. 16 at point A' on the plot of FIG. 17, consistent with embodiments of the present disclosure.
Figure 19B:
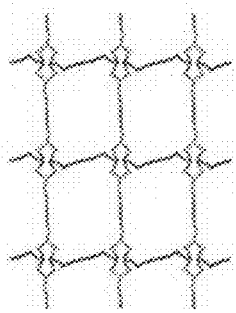
FIG. 19B is a representation of the deformation of the auxetic material of FIG. 16 at point B' on the plot of FIG. 17, consistent with embodiments of the present disclosure.
Figure 19C:
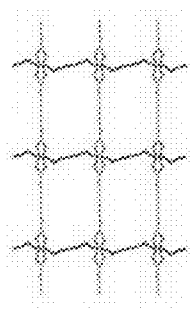
FIG. 19C is a representation of the deformation of the auxetic material of FIG. 16 at point C' on the plot of FIG. 17, consistent with embodiments of the present disclosure.

The plot of FIG. 17 plots the Poisson's ratio against tensile strain for both the auxetic material 1505 having the star shaped contiguous core cell 1500 and the auxetic material 1605 having the bow-tie shaped contiguous core cell 1600. The auxetic material 1505 is illustrated as the solid line and the auxetic material 1605 is illustrated as the broken line. As shown, both the star shaped contiguous core cell 1500 and the bow-tie shaped contiguous core cell 1600 result in the auxetic materials 1505,1605 having an initial Poisson's ratio of approximately −0.6. However, at least initially, the bow-tie shaped contiguous core cell 1600 results in a more negative Poisson's ratio than the star shaped contiguous core cell 1500. As shown, the Poisson's ratio for both auxetic materials 1505,1605 remains substantially constant until approximately 30% deformation. Between approximately 30% and approximately 45% deformation the Poisson's ratio increases and for deformations in excess of approximately 45% the rate of increase for the Poisson's ratio begins to slow. As such, the deformation may generally be described as having three stages. Points A, B, and C on the plot of FIG. 17 may generally correspond to the deformation of the auxetic material 1505 as represented in FIGS. 18A, 18B, and 18C, respectively. Points A', B', and C' on the plot of FIG. 17 may generally correspond to the deformation of the auxetic material 1605 as represented in FIGS. 19A, 19B, and 19C, respectively.

Figure 20:
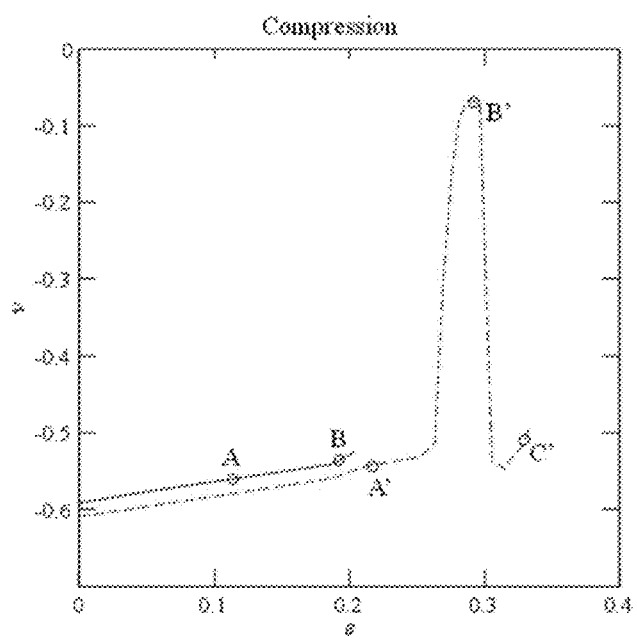
FIG. 20 is a plot of the Poison's ratio against compressive strain for the auxetic materials of FIGS. 15 and 16, consistent with embodiments of the present disclosure.

The plot of FIG. 20 plots the Poisson's ratio against compressive strain for both the auxetic material 1505 having the star shaped contiguous core cell 1500 and the auxetic material 1605 having the bow-tie shaped contiguous core cell 1600. The auxetic material 1505 is illustrated as the solid line and the auxetic material 1605 is illustrated as the broken line. As shown, both the star shaped contiguous core cell 1500 and the bow-tie shaped contiguous core cell 1600 result in the auxetic materials 1505,1605 having an initial Poisson's ratio of approximately −0.6. However, the bow-tie shaped contiguous core cell 1600 results in a more negative Poisson's ratio than the star shaped contiguous core cell 1500.

As shown, the Poisson's ratio for both auxetic materials 1505, 1605 remains substantially constant until approximately 25% of deformation. When compared to the auxetic material 100 of FIG. 1 or the auxetic material 602 of FIG. 6A, the Poisson's ratio remains substantially constant for a greater amount of deformation. This result occurs because the auxetic materials 1505, 1605 having a star shaped core cell 1500 or bow-tie shaped core cell 1600 are more resistant to buckling (e.g., in FIG. 15 the first rib 110 contacts at least one of the second rib 120 and/or contiguous core cell 1500, 1600) when compared to the auxetic material 100 and the auxetic material 602.

Figure 21A:
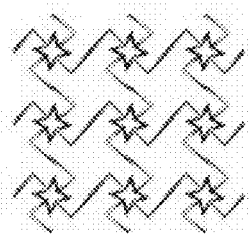
FIG. 21A is a representation of the deformation of the auxetic material of FIG. 15 at point A on the plot of FIG. 20, consistent with embodiments of the present disclosure.
Figure 21B:
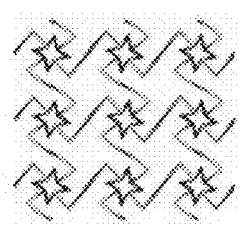
FIG. 21B is a representation of the deformation of the auxetic material of FIG. 15 at point B on the plot of FIG. 20, consistent with embodiments of the present disclosure.
Figure 22A:
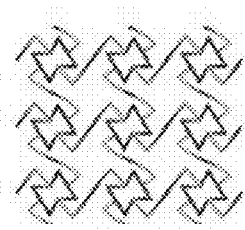
FIG. 22A is a representation of the deformation of the auxetic material of FIG. 16 at point A' on the plot of FIG. 20, consistent with embodiments of the present disclosure.
Figure 22B:
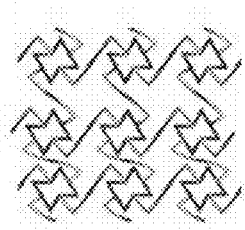
FIG. 22B is a representation of the deformation of the auxetic material of FIG. 16 at point B' on the plot of FIG. 20, consistent with embodiments of the present disclosure.
Figure 22C:
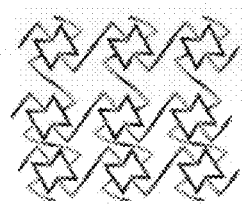
FIG. 22C is a representation of the deformation of the auxetic material of FIG. 16 at point C' on the plot of FIG. 20, consistent with embodiments of the present disclosure.

Points A and B on the plot of FIG. 20 may generally correspond to the deformation of the auxetic material 1505 as represented in FIGS. 21A and 21B, respectively. As shown, in FIGS. 21A and 21B the deformation of the auxetic material 1505 may not be uniform in compression due to, for example, local instabilities within the auxetic material 1505. Points A', B', and C' on the plot of FIG. 20 may generally correspond to the deformation of the auxetic material 1605 as represented in FIGS. 22A, 22B, and 22C, respectively. As shown, in FIGS. 22A, 22B, and 22C the deformation of the auxetic material 1605 may not be uniform in compression due to, for example, local instabilities within the auxetic material 1605.

Figure 23:
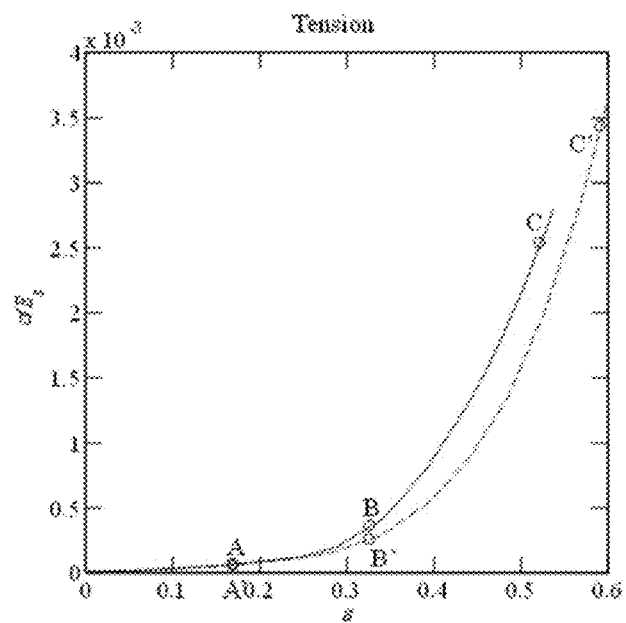
FIG. 23 a plot of the non-dimensional stress against tensile strain for the auxetic materials of FIGS. 15 and 16, consistent with embodiments of the present disclosure.

The plot of FIG. 23 plots the non-dimensional stress against tensile strain for both the auxetic material 1505 having the star shaped contiguous core cell 1500 and the auxetic material 1605 having the bow-tie shaped contiguous core cell 1600. The auxetic material 1505 is illustrated as the solid line and the auxetic material 1605 is illustrated as the broken line. Both of the auxetic materials 1505, 1605 exhibit a hardening stage after the first ribs 110 are substantially linear. On the plot of FIG. 23, the auxetic materials 1505, 1605 are shown as entering a hardening stage at the location on the plot where the slope of the stress-strain curve begins to increase. The hardening stage can generally be described as the beginning of the densification of the auxetic materials 1505, 1605. In other words, the first rib 110 may begin to contact at least one of the second rib 120 and/or contiguous core cell 1500, 1600.

As shown, the auxetic material 1505 including the star shaped contiguous core cell 1500 enters the hardening stage before the auxetic material 1605 including the bow-tie shaped contiguous core cell 1600. However, both the auxetic materials 1505, 1605 are approximately one-and-a-half times stiffer than the auxetic material 100 of FIG. 1. Points A, B, and C on the plot of FIG. 23 may generally correspond to the deformation of the auxetic material 1505 having the star shaped contiguous core cell 1500 as represented in FIGS. 18A, 18B, and 18C, respectively, and points A', B', and C' may generally correspond to the deformation of the auxetic material 1605 having the bow-tie shaped contiguous core cell 1600 as represented in FIGS. 19A, 19B, and 19C, respectively.

Figure 24:
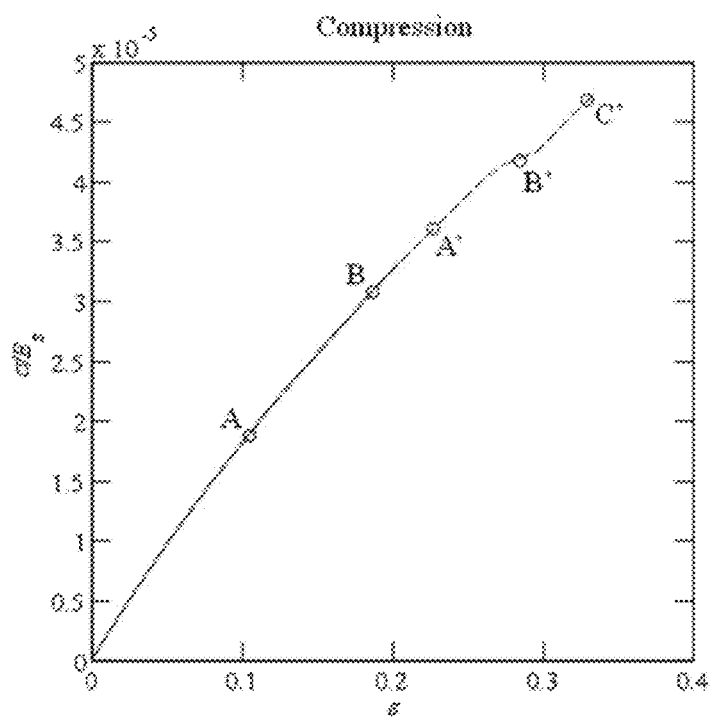
FIG. 24 a plot of the non-dimensional stress against compressive strain for the auxetic materials of FIGS. 15 and 16, consistent with embodiments of the present disclosure.

The plot of FIG. 24 plots the non-dimensional stress against compressive strain for both the auxetic material 1505 having the star shaped contiguous core cell 1500 and the auxetic material 1605 having the bow-tie shaped contiguous core cell 1600. The auxetic material 1505 is illustrated as the solid line and the auxetic material 1605 is illustrated as the broken line. Both auxetic materials 1505, 1605 exhibit a yielding stage when the first rib 110 begins to buckle. When the first rib 110 fully collapses an additional hardening stage may occur. Reference to fully collapse means that the first rib 110 is in contact with the contiguous core cell 1500, 1600 such that there is no further densification of the auxetic material 1505, 1605. On a stress-strain curve, a yielding stage is illustrated when the slope of the curve decreases and the hardening stage is illustrated by the slope of the curve increasing. Points A and B on the plot of FIG. 24 may generally correspond to the deformation of the auxetic material 1605 having the star shaped contiguous core cell 1600 as represented in FIGS. 21A and 21B, respectively, and points A', B', and C' may generally correspond to the deformation of the auxetic material 1605 having the bow-tie shaped contiguous core cell 1600 as represented in FIGS. 22A, 22B, and 22C, respectively.

Referring also to FIGS. 25-29, in some embodiments, auxetic materials may include contiguous core cells having an elastic modulus (or Young's modulus) that is different from at least one of the first rib 110 or the second rib 120. For example, the ratio of the elastic modulus of the contiguous core cell sections ($E_c$) to the elastic modulus of each of the ribs ($E_r$) may be between 0.01 and 10,000. More particularly the ratio of $E_c$ to $E_r$ may be between 0.1 and 100. Even more particularly the ratio of ratio of $E_c$ to $E_r$ may be 0.01, 0.1, 1, 10, 100, or 1,000.

Figure 25:
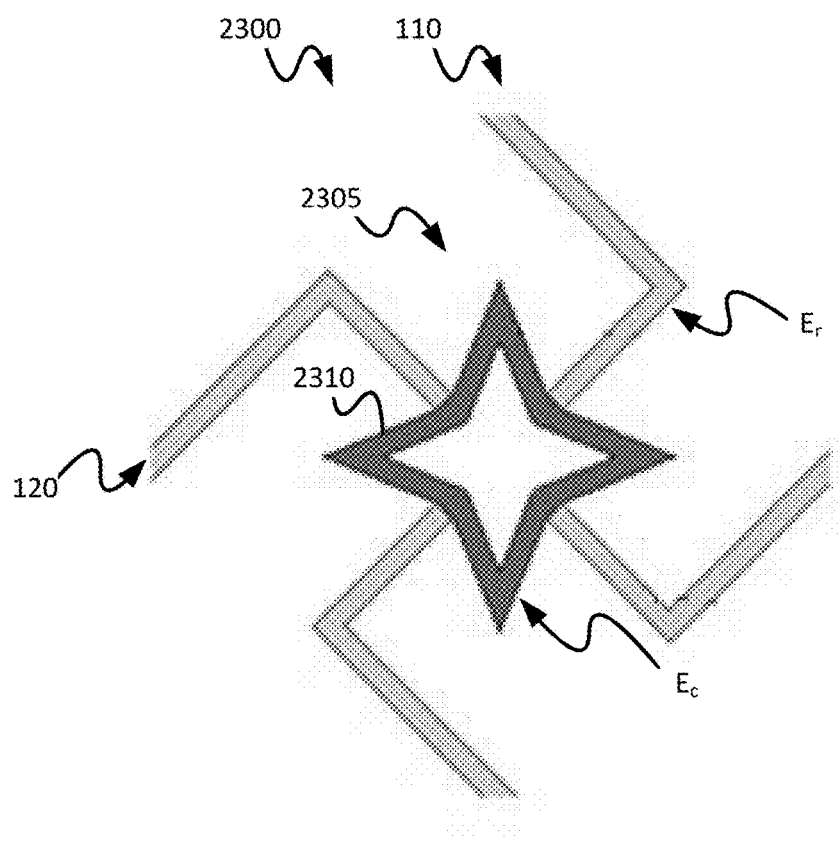
FIG. 25 is an example embodiment the star shaped contiguous core cell of FIG. 15 having a different elastic modulus than the ribs of the auxetic material of FIG. 15, consistent with embodiments of the present disclosure.

For example, FIG. 25 shows an auxetic structure 2300 that includes a star shaped contiguous core cell 2305. In this example, the first rib 110 and the second rib 120 have the same elastic modulus ($E_r$). However, in other embodiments the first rib 110 and the second rib 120 may each have a different elastic modulus. Continuing with the example, each of the core cell sections 2310 may also have the same elastic modulus ($E_c$). However, in other embodiments, at least one of the core cell sections 2310 may have an elastic modulus different from another core cell section 2310. Returning again to the example, the elastic modulus for each of the ribs 110,120 may be different from the elastic modulus of each of the core cell sections 2310. However, in other embodiments, the elastic modulus for each of the ribs 110,120 is the same as the elastic modulus of each of the core cell sections 2310.

Figure 26:
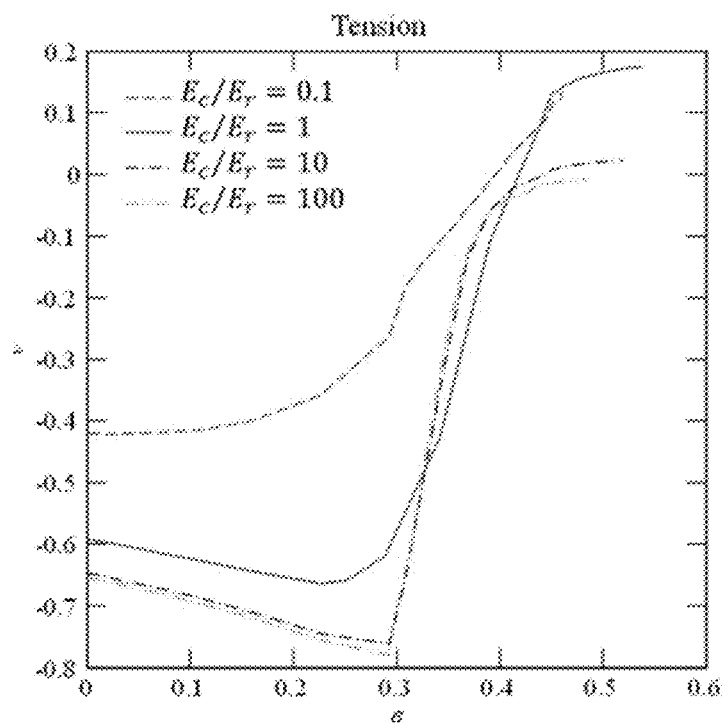
FIG. 26 is a plot of the Poisson's ratio against tensile strain for the auxetic material of FIG. 25 for different ratios of elastic moduli, consistent with embodiments of the present disclosure.

The plot of FIG. 26 plots the Poisson's ratio against the tensile strain for multiple auxetic materials that include various embodiments of the auxetic structure 2300 of FIG. 25. FIG. 26 illustrates the effect of altering the elastic modulus of the ribs 110,120 and/or the core cell sections 2310. Specifically, FIG. 26 illustrates the effect on the Poisson's ratio for a given strain value for auxetic structures having a ratio of the elastic modulus of the contiguous core cell ($E_c$) to the elastic modulus of each of the ribs ($E_r$) of 0.1, 1, 10, and 100.

Figure 27:
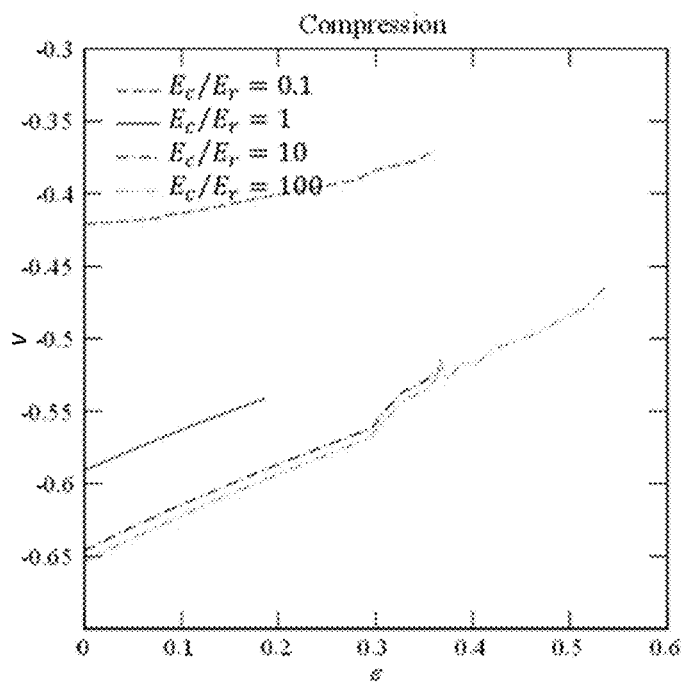
FIG. 27 is a plot of the Poisson's ratio against compressive strain for the auxetic material of FIG. 25 for different ratios of elastic moduli, consistent with embodiments of the present disclosure.

The plot of FIG. 27 plots the Poisson's ratio against the compressive strain for multiple auxetic materials that include various embodiments of the auxetic structure 2300 of FIG. 25. FIG. 27 illustrates the effect of altering the elastic modulus of the ribs 110,120 and/or the core cell sections 2310. Specifically, FIG. 27 illustrates the effect on the Poisson's ratio for a given strain value for auxetic structures having a ratio of the elastic modulus of the contiguous core cell ($E_c$) to the elastic modulus of each of the ribs ($E_r$) of 0.1, 1, 10, and 100. As shown in the plots of FIG. 26, the curve shows three stages. The initial Poisson's ratio will decrease when Ec/Er increases, however there appears to be a limit for this correlation. When Ec/Er increased from 10 to 100, the Poisson's ratio only drops a relatively small amount. When Ec/Er increased beyond 100, the core is no longer capable of substantial deformation (elongation) and becomes relatively more rigid and the Poisson's ratio appears to undergo relatively small change and/or levels off. With respect to FIG. 27, the data similar shows that when Ec/Er increases there is a drop in the value of Poisson's ratio.

Figure 28:
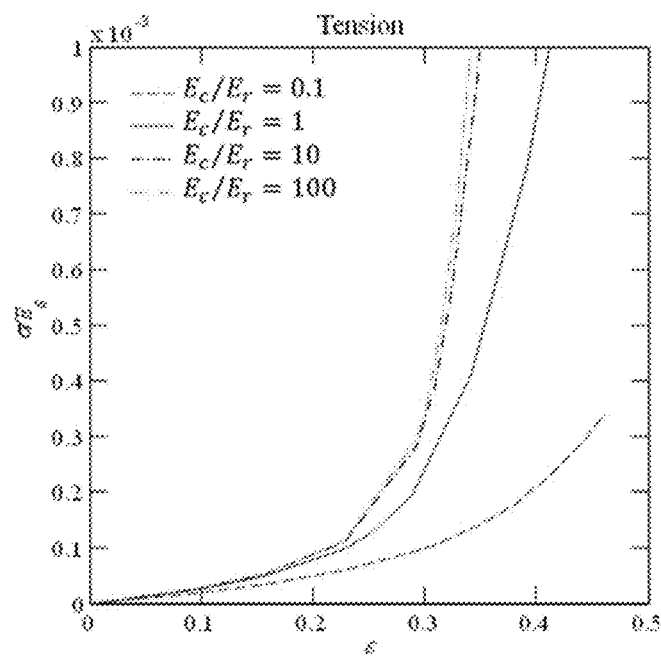
FIG. 28 is a plot of the non-dimensional stress against tensile strain for the auxetic material of FIG. 25 for different ratios of elastic moduli, consistent with embodiments of the present disclosure.
Figure 29:
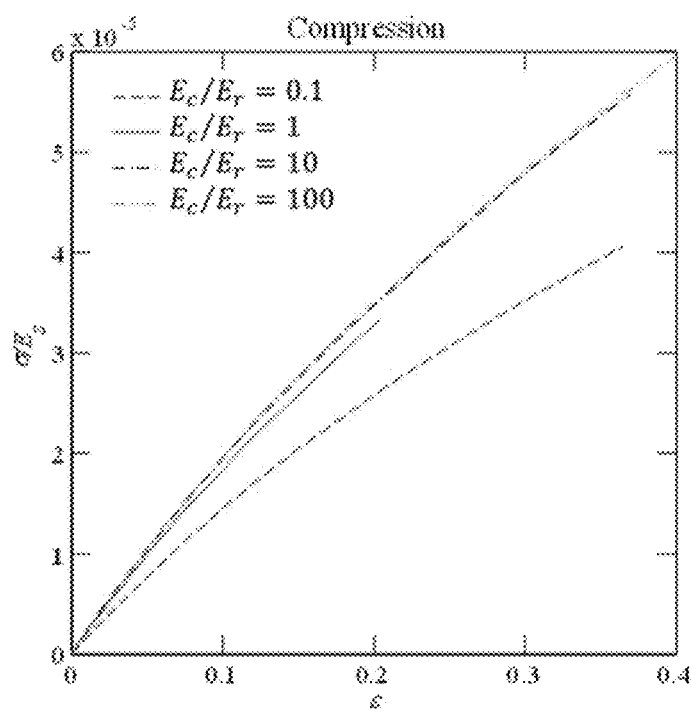
FIG. 29 is a plot of the non-dimensional stress against compressive strain for the auxetic material of FIG. 25 for different ratios of elastic moduli, consistent with embodiments of the present disclosure.

The plot of FIG. 28 plots the non-dimensional stress against the tensile strain for multiple auxetic materials including a star shaped contiguous core cell, wherein a ratio of the elastic modulus of the contiguous core cell ($E_c$) to the elastic modulus of the ribs ($E_r$) is one of 0.1, 1, 10, and 100, respectively. The plot of FIG. 29 plots the non-dimensional stress against the compressive strain for multiple auxetic materials including a star shaped contiguous core cell, wherein a ratio of the elastic modulus of the contiguous core cell ($E_c$) to the elastic modulus of the ribs ($E_r$) is one of 0.1, 1, 10, and 100, respectively. As shown in the plots of FIGS. 28 and 29, as the ratio of $E_c/E_r$ increases the effective stiffness of the auxetic material increases (e.g., the slope of the stress-strain curve or for the auxetic material increases). However, as the ratio of $E_c/E_r$ increases from 10 to 100 the non-dimensional stress-strain curves only change slightly due to the increasing rigidity of the star shaped contiguous core cell. Again, the ability of the star-shaped contiguous core cell to undergo deformation by elongation is substantially exhausted. When the ratio of $E_c/E_r$ exceeds 100, increasing the ratio may not result in substantial changes to the stress-strain curve.

Referring also to FIGS. 30-37, in some embodiments, auxetic materials may include contiguous core cells wherein at least one of the core cell sections has an elastic modulus (or Young's modulus) that is different from at least one other core cell section. For example, a ratio for the elastic moduli between at least one core cell section and at least one other core cell section may be between 0.01 and 10,000. More particularly the ratio may be between 0.1 and 100. Even more particularly the ratio of ratio may be 0.01, 0.1, 1, 10, 100, or 1,000.

Figure 30:
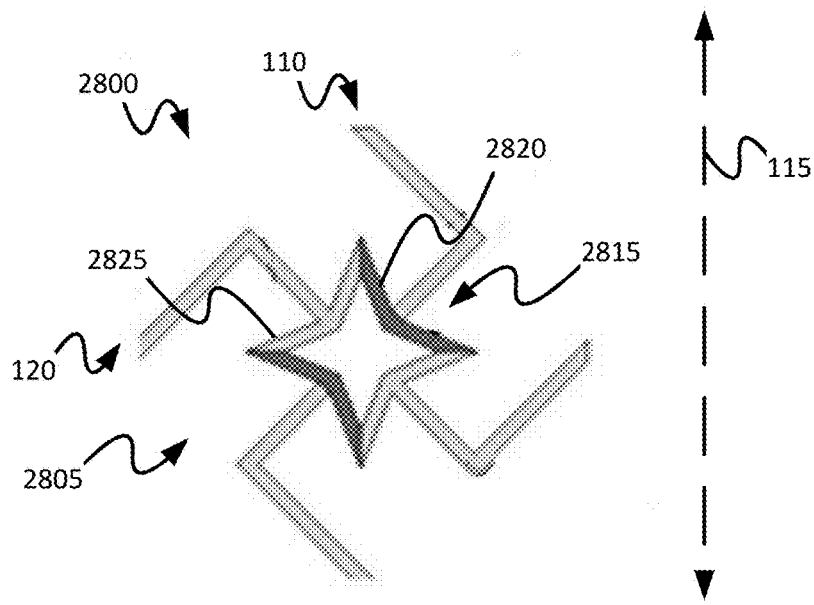
FIG. 30 is an embodiment of the star shaped contiguous core cell of FIG. 15, wherein a portion of the star shaped contiguous core cell has a different elastic modulus than another portion, consistent with embodiments of the present disclosure.

For example, FIG. 30 shows an auxetic structure 2800 that includes a star shaped contiguous core cell 2805. In this example, the star shaped contiguous core cell 2805 includes at least four core cell sections, wherein each of the core cell sections defines a concave region 2815. As shown, each concave region 2815 is opposite another concave region 2815. In some embodiments, opposing concave regions 2815 may have the same or substantially the same elastic modulus and adjacent concave regions 2815 may have a different elastic modulus. When a force is applied parallel to the longitudinal axis 115, the concave regions 2815 adjacent the first rib 110 may generally described as the active concave regions 2820 and the concave regions 2815 adjacent the second rib 120 may generally be described as passive concave regions 2825. In some instances, the active concave regions 2820 may have a greater elastic modulus than the passive concave regions 2825. For example, the elastic modulus for the active concave regions 2820 may be 10, 100, 1,000, or 10,000 times larger than the elastic modulus for passive concave regions 2825. More preferably, when the elastic modulus of the active concave region 2820 is at least ten times greater than the passive concave regions 2825. However, such a configuration is non-limiting. For example, in some embodiments, the passive concave regions 2825 may have a greater elastic modulus than the active concave regions 2820. By way of further example, in some embodiments, for example, adjacent concave regions 2815 may have the same elastic modulus and opposing concave regions 2815 may have a different elastic modulus.

Figure 31:
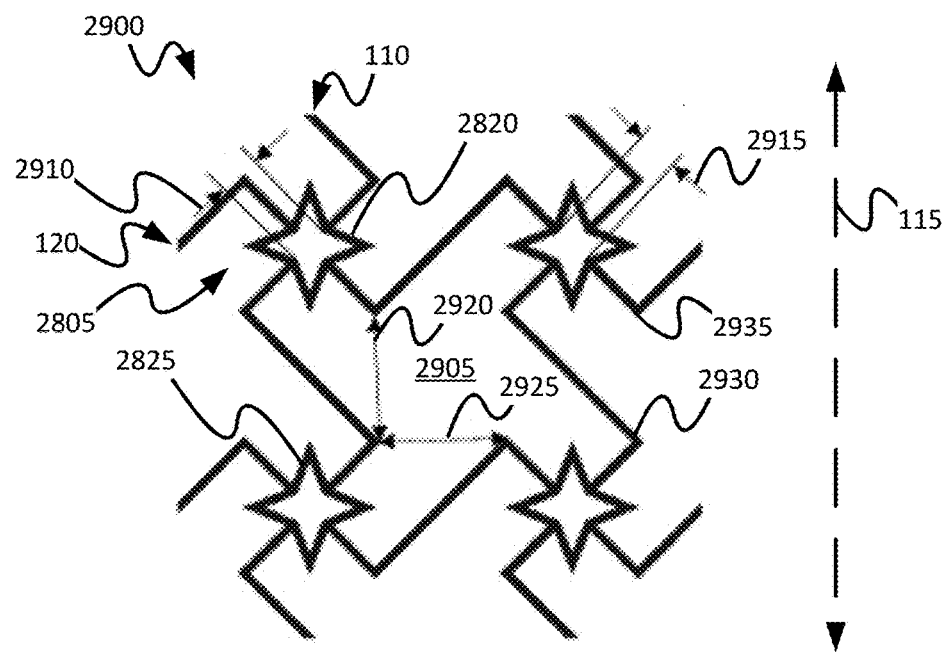
FIG. 31 shows an embodiment of the auxetic material of FIG. 1 having the star shaped contiguous core cell of FIG. 30, consistent with embodiments of the present disclosure.

For example, FIG. 31 shows an auxetic material 2900 having four star shaped contiguous core cells 2805, wherein the first rib 110, the second rib 120, and each of the star shaped contiguous core cells 2805 collectively define a chiral cell 2905. As shown, each star shaped contiguous core cell 2805 is defined, at least in part, by a first separation distance 2910 between the active concave regions 2820 and a second separation distance 2915 between the passive concave regions 2825. Additionally, the chiral cell 2905 may be defined, at least in part, by a longitudinal separation distance 2920 between one of a plurality of vertices 2930 of the first rib 110 and one of a plurality of vertices 2935 of the second rib 120 and a transverse separation distance 2925 extending between one of the plurality of vertices 2930 of the first rib 110 and one of the plurality of vertices 2935 of the second rib 120. Prior to deformation, for example, the first separation distance 2910 may measure approximately between 50 nm and 50 mm, the second separation distance 2915 may measure approximately between 50 nm and 50 mm, the longitudinal separation distance 2920 may measure approximately between 50 nm and 50 mm, and the transverse separation distance 2925 may measure approximately between 50 nm and 50 mm. More specifically, the first separation distance 2910 may measure approximately 4.22 mm, the second separation distance 2920 may measure approximately 4.22 mm, the longitudinal separation distance 2920 may measure approximately 14.29 mm, and the transverse separation distance 2925 may measure approximately 14.29 mm.

Manipulating the elastic moduli for the active and passive concave regions 2820, 2825 allows for the rate of change of the first, second, longitudinal, and transverse separation distances 2910,2915,2920,2925 to be controlled. For example, due to the active concave regions 2820 having a higher elastic modulus than the passive concave regions 2825 (e.g., when the elastic modulus for the active concave regions 2820 is at least ten times greater than the elastic modulus of the passive concave regions 2825), when a tensile force is initially applied parallel to the longitudinal axis 115, the size of the chiral cell 2905 begins to increase (e.g., expand). In other words, the longitudinal separation distance 2920 and the transverse separation distance 2925 increase as the chiral cell 2905 and the star shaped contiguous core cells 2805 begin to rotate due to the straightening of the first and second ribs 110,120. With continued rotation, the size of both the chiral cell 2905 and the size of the star shaped contiguous core cells 2805 begins to increase (e.g., expand). In other words, at least one of the first separation distance 2910 between the active concave regions 2820 and the second separation distance 2915 between the passive concave regions 2825 begins to increase. The rate at which the chiral cell 2905 and the star shaped contiguous core cells 2805 expand may vary. For example, the rate of expansion for the chiral cell 2905 may initially be greater than the rate of expansion for the star shaped contiguous core cells 2805. However, as the chiral cell 2905 continues to expand, its expansion rate may decrease while the expansion rate of the star shaped contiguous core cell 2805 increases. As a result, the auxetic material 2900 may be described as having a multi-stage deformation.

The expansion of the longitudinal separation distance 2920, the transverse separation distance 2925, the first separation distance 2910 between the active concave regions 2820, and the second separation distance 2915 between the passive concave regions 2825 may be expressed as an expansion ratio (Rd). Mathematically, the expansion ratio (Rd) may be expressed according to the following equation:

$$Rd = \frac{\text{deformed separation distance} - \text{initial separation distance}}{\text{initial separation distance}} \quad [1]$$

Figure 32:
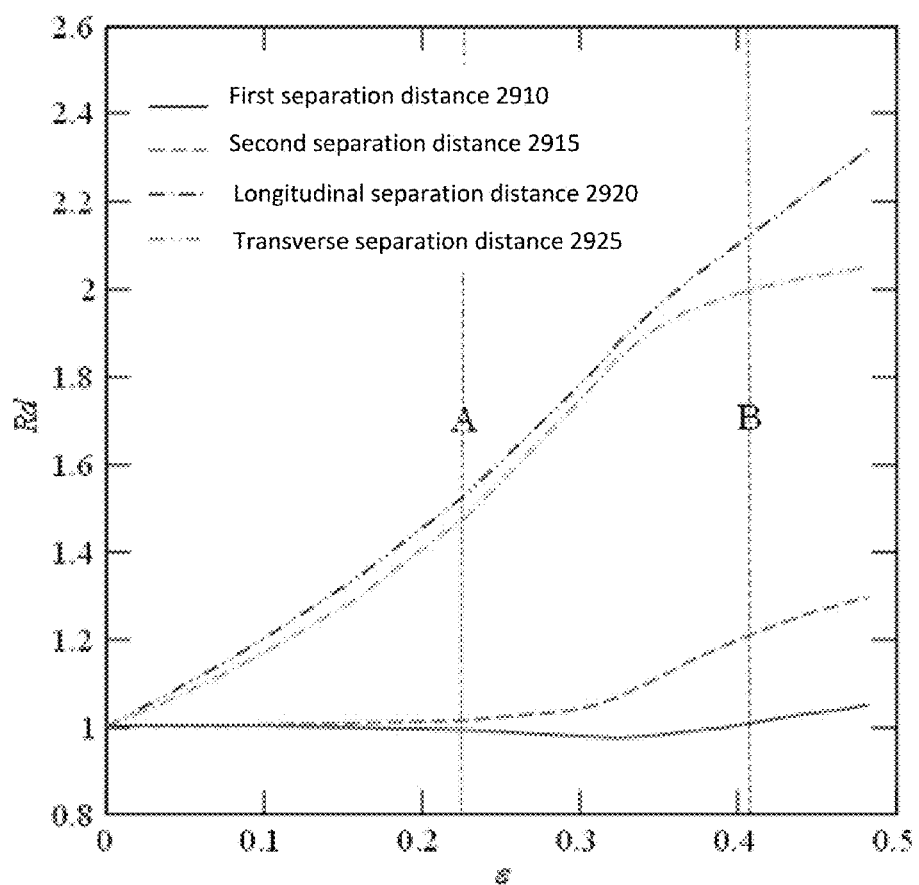
FIG. 32 plots various expansion ratios (Rd) against tensile strain for the auxetic material of FIG. 31, consistent with embodiments of the present disclosure.
Figure 33A:
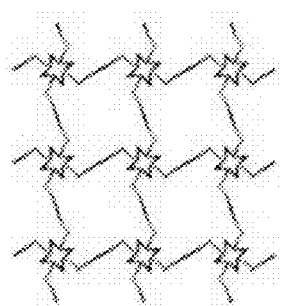
FIG. 33A is a representation of the deformation of the auxetic material of FIG. 31 at point A on the plot of FIG. 32, consistent with embodiments of the present disclosure.
Figure 33B:
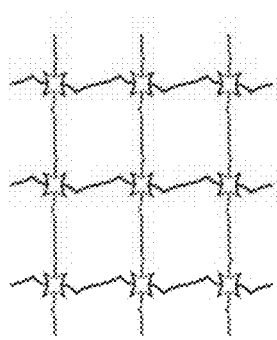
FIG. 33B is a representation of the deformation of the auxetic material of FIG. 31 at point B on the plot of FIG. 32, consistent with embodiments of the present disclosure.

In the above equation, the initial separation distance is the distance, prior to separation due to a tensile load, of longitudinal separation distance 2920, or transverse separation distance 2925, or first separation distance 2910 or second separation distance 2915, individually. The deformed separation distance may similarly be any one of 2920, 2925, 2910 or 2915, individually, after imposition of a tensile load. The plot of FIG. 32 plots the expansion ratio against tensile strain for each of the longitudinal separation distance 2920, the transverse separation distance 2925, the first separation distance 2910 between the active concave regions 2820, and the second separation distance 2915 between the passive concave regions 2825, wherein the elastic modulus for the active concave regions 2820 is 100 times greater than the elastic modulus for the passive concave regions 2825. As shown, the longitudinal separation distance 2920 and the transverse separation distance 2925 increase substantially linearly for at least a portion of the overall deformation. Therefore, the rate of expansion for the chiral cell 2905 is substantially proportional in both the longitudinal and the transverse directions. However, once the first rib 110 is substantially straight when under tension (e.g., between about 25% and 30% deformation), the expansion of the chiral cell 2905 begins to slow more rapidly in the transverse direction than the longitudinal direction. In contrast, the star shaped contiguous core cell 2805 expands relatively more rapidly in the transverse direction than in the longitudinal direction. The deformation of the auxetic material 2900 at vertical lines A and B may generally correspond to the deformation shown in FIGS. 33A and 33B, respectively.

Figure 34:
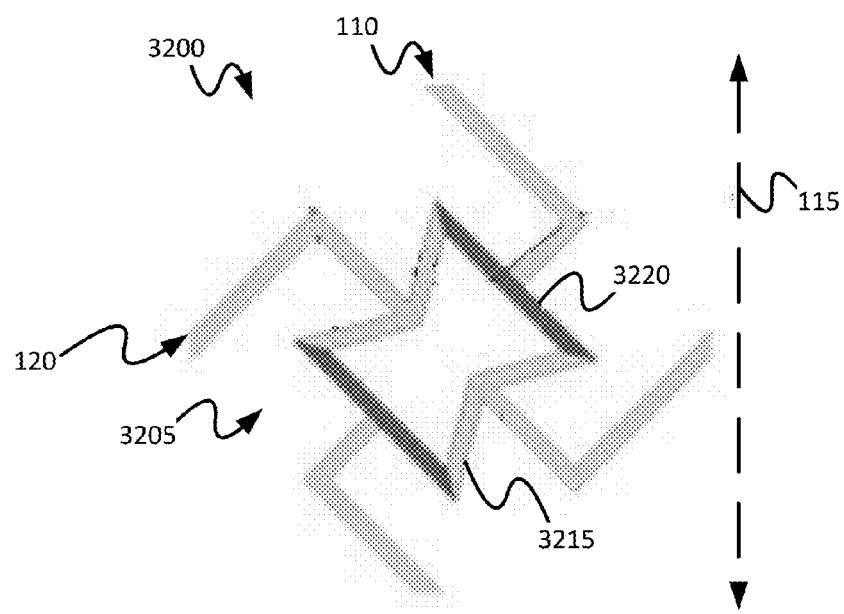
FIG. 34 is an embodiment of the bow-tie shaped contiguous core cell of FIG. 16, wherein a portion of the bow-tie shaped contiguous core cell has a different elastic modulus than another portion, consistent with embodiments of the present disclosure.

By way of further example, FIG. 34 shows an auxetic structure 3200 that includes a bow-tie shaped contiguous core cell 3205. In this example, the bow-tie shaped contiguous core cell 3205 includes at least four core cell sections, wherein at least two of the core cell sections define a plurality of concave regions 3215 and at least two of the core cell sections define a plurality of substantially planar regions 3220. As shown, each concave region 3215 is opposite another concave region 3215 and each substantially planar region 3220 is opposite another substantially planar region 3220. As is also shown, at least a portion of the first rib 110 extends from one of the substantially planar regions 3220 and at least a portion of the second rib 120 extends from the concave region 3215. In this instance, for example, when a force is applied parallel to the longitudinal axis 115, the concave regions 3215 may be generally referred to as a passive region and the substantially planar region 3220 may generally be referred to as an active region. Therefore, in some instances, the substantially planar regions 3220 may have a greater elastic modulus than the concave regions 3215. For example, the elastic modulus for the substantially planar regions 3220 may be 10, 100, 1,000, or 10,000 times larger than the elastic modulus for the concave regions 3215. More preferably, the elastic moduli for the substantially planar regions 3220 are at least ten times greater than the elastic moduli of the concave regions 3215. However, such a configuration is non-limiting.

Figure 35:
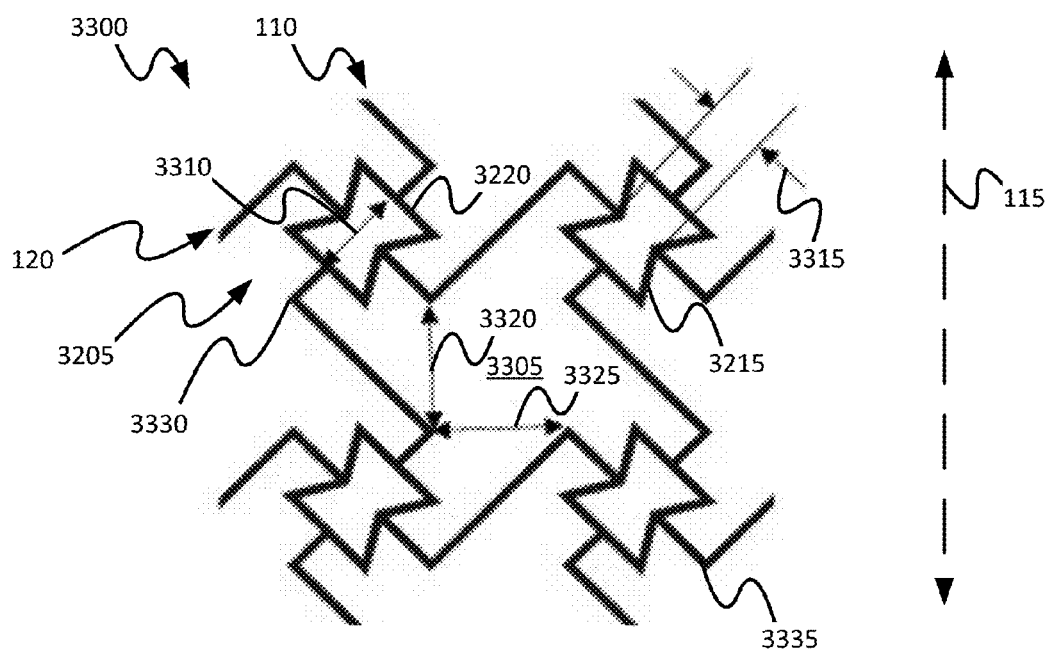
FIG. 35 shows an embodiment of the auxetic material of FIG. 1 having the bow-tie shaped contiguous core cell of FIG. 34, consistent with embodiments of the present disclosure.

For example, FIG. 35 shows of an auxetic material 3300 having four bow-tie shaped contiguous core cells 3205, wherein the first rib 110, the second rib 120, and each of the bow-tie shaped contiguous core cells 3205 collectively define a chiral cell 3305. When, for example, the substantially planar regions 3220 have an elastic modulus different from the concave regions 3215, the expansion of the bow-tie shaped contiguous core cell 3205 and the expansion of the chiral cell 3305 can be controlled. As shown, each bow-tie shaped contiguous core cell 3205 is defined, at least in part, by a first separation distance 3310 between the substantially planar regions 3220 and a second separation distance 3315 between the concave regions 3215. Additionally, the chiral cell 3305 may be defined, at least in part, by a longitudinal separation distance 3320 extending between one of a plurality of vertices 3330 of the first rib 110 and one of a plurality of vertices 3335 of the second rib 120 and a transverse separation distance 3325 extending between one of the plurality of vertices 3330 of the first rib 110 and one of the plurality of vertices 3335 of the second rib 120.

Prior to deformation, for example, the first separation distance 3310 may measure approximately between 50 nm and 50 mm, the second separation distance 3315 may measure approximately between 50 nm and 50 mm, the longitudinal separation distance 3320 may measure approximately between 50 nm and 50 mm, and the transverse separation distance 3325 may measure approximately between 50 nm and 50 mm. More specifically, the first separation distance 3310 may measure approximately 9.61 mm, the second separation distance 3315 may measure approximately 3.33 mm, the longitudinal separation distance 3320 may measure approximately 14.29 mm, and the transverse separation distance 3325 may measure approximately 14.29 mm.

Due to the different elastic moduli, when a tensile force is initially applied parallel to the longitudinal axis 115, the size of the chiral cell 3305 begins to increase (e.g., expand). In other words, the longitudinal separation distance 3320 and the transverse separation distance 3325 increase as the chiral cell 3305 and the bow-tie shaped contiguous core cells 3205 begin to rotate due to the straightening of the first and second ribs 110, 120. With continued rotation, the size of both the chiral cell 3305 and the size of the bow-tie shaped contiguous core cells 3205 begins to increase (e.g., expand). In other words, at least one of the first separation distance 3310 between the substantially planar region 3220 and the second separation distance 3315 between the concave regions 3215 begins to increase. The rate at which the chiral cell 3305 and the bow-tie shaped contiguous core cells 3205 expand may vary. For example, the rate of expansion for the chiral cell 3305 may initially be greater than the rate of expansion for the bow-tie shaped contiguous core cells 3205. However, as the chiral cell 3305 continues to expand, its expansion rate may decrease while the expansion rate of the bow-tie shaped contiguous core cell 3205 increases. As a result, the auxetic material 3200 may be described as having a multi-stage deformation.

The expansion of the longitudinal separation distance 3320, the transverse separation distance 3325, the first separation distance 3310 between the between the substantially planar regions 3220, and the second separation distance 3315 between the concave regions 3215 may be expressed as an expansion ratio (Rd). Mathematically, the expansion ratio (Rd) may be expressed according to equation 1, discussed above.

Figure 36:
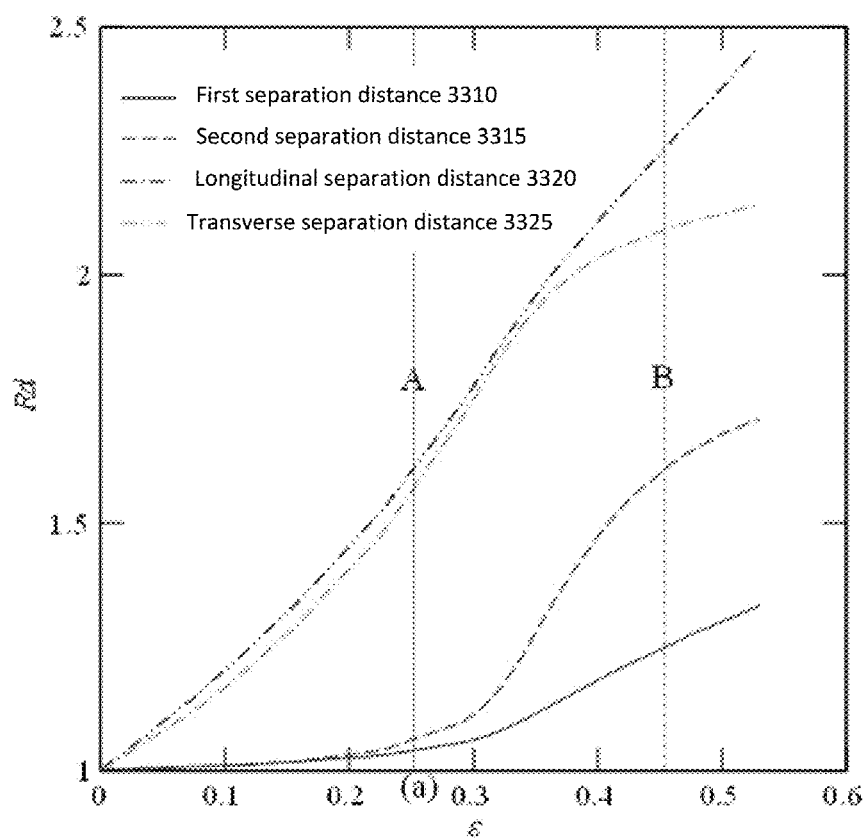
FIG. 36 plots various expansion ratios (Rd) against tensile strain for the auxetic material of FIG. 35, consistent with embodiments of the present disclosure.
Figure 37A:
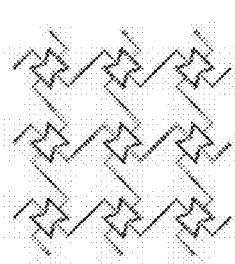
FIG. 37A is a representation of the deformation of the auxetic material of FIG. 35 at point A on the plot of FIG. 36, consistent with embodiments of the present disclosure.
Figure 37B:
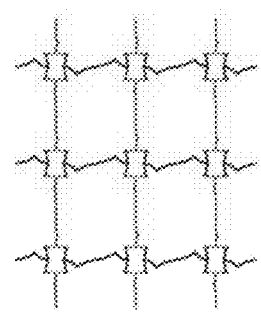
FIG. 37B is a representation of the deformation of the auxetic material of FIG. 35 at point B on the plot of FIG. 36, consistent with embodiments of the present disclosure.

The plot of FIG. 36 plots the expansion ratio against tensile strain for each of the longitudinal separation distance 3320, the transverse separation distance 3325, the first separation distance 3310 between the between the substantially planar regions 3220, and the second separation distance 3315 between the concave regions 3215, wherein the elastic modulus for the substantially planar regions 3220 is 100 times greater than the elastic modulus for the concave regions 3215. As shown, the longitudinal separation distance 3320 and the transverse separation distance 3325 increase substantially linearly for at least a portion of the overall deformation. Therefore, the rate of expansion for the chiral cell 3305 is substantially proportional in both the longitudinal and the transverse directions. However, once the first rib 110 is substantially linear (e.g., between about 25% and 30% deformation), the expansion of the chiral cell 3305 begins to slow more rapidly in the transverse direction than the longitudinal direction. In contrast, the bow-tie shaped contiguous core cell 3205 expands relatively more rapidly in the transverse direction than in the longitudinal direction. The deformation of the auxetic material 3300 at vertical lines A and B may generally correspond to the deformation shown in FIGS. 37A and 37B, respectively.

Figure 38:
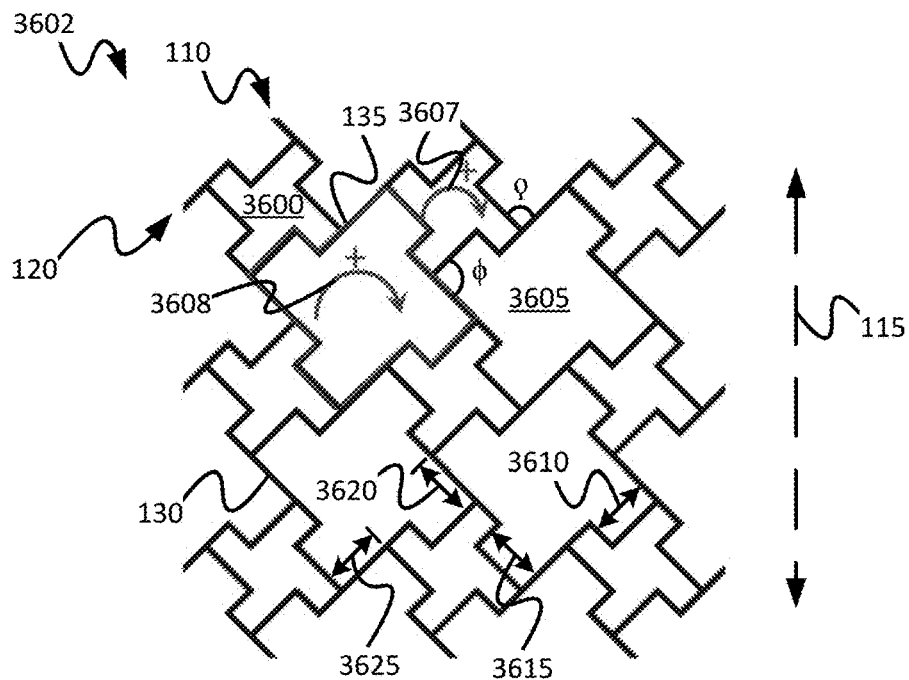
FIG. 38 shows an embodiment of the auxetic material of FIG. 1 having a chiral shaped contiguous core cell, consistent with embodiments of the present disclosure.

Referring also to FIGS. 38-51, the auxetic material 100 of FIG. 1 may also include a contiguous core cell having a chiral shape to form a material 3602. In some embodiments, a contiguous core cell having a chiral shape is not symmetrical about any axis. Additionally, or alternatively, in some embodiments a contiguous core cell having a chiral shape is not superimposable on its mirror image. As shown in FIG. 38, a chiral shaped contiguous core cell 3600 is included within the first rib 110 and the second rib 120. In other words, one or more first and second rib sections 130,135 may not extend into or be enclosed within the chiral shaped contiguous core cell 3600 but one or more of the first and/or second rib sections 130,135 may extend from the chiral shaped contiguous core cell 3600. As shown, the first ribs 110, the second ribs 120, and at least four chiral shaped contiguous core cells 3600 collectively define a chiral cell 3605.

As shown, the first sections 130 may extend between longitudinally separated chiral shaped contiguous core cells 3600 and the second rib sections 135 may extend between transversely separated chiral shaped contiguous core cells 3600. As a result, the first ribs and the second ribs 110,120 include the chiral shaped contiguous core cells 3600. As shown, the first rib sections 130 may form an adjoining angle ϕ with the chiral shaped contiguous core cell 3600. The adjoining angle ϕ may be between 10° and 90°. More particularly, the adjoining angle ϕ may be between 45° and 90°. Even more particularly, in some embodiments, the adjoining angle ϕ may be 90°. Similarly, the second rib sections 135 may also form an adjoining angle ♀ with the chiral shaped contiguous core cell 3600. The adjoining angle ♀ may be between 10° and 90°. More particularly, the adjoining angle ♀ may be between 45° and 90°. Even more particularly, in some embodiments, the adjoining angle ♀ may be 90°.

When a tensile force parallel to the longitudinal axis 115 is applied to the material 3602, both the chiral cell 3605 and the chiral shaped contiguous core cell 3600 may be described as rotating in the same direction, as is generally illustrated by directional arrows 3607, 3608. In other words, the material 3602 may generally be described as having co-rotational cells. The rotation of the chiral shaped contiguous core cell 3600 and the chiral cell 3605 is similar to the rotation of the auxetic structures 105 and the chiral cells 122,610 of FIGS. 1-14. Accordingly further discussion of the rotation of the chiral shaped contiguous core cell 3600 and the chiral cell 3605 is omitted for the sake of brevity.

The co-rotation of the chiral shaped contiguous core cell 3600 and the chiral cell 3605 may be influenced by a first separation distance 3610 between one of the first rib sections 130 and the chiral shaped contiguous core cell 3600 and/or a second separation distance 3615 between one of the second rib sections 135 and the chiral shaped contiguous core cell 3600. For example, the first separation distance 3610 may be greater than or equal to a length 3620 of the first rib section 130 and the second separation distance 3615 may be greater than or equal to a length 3625 of the second rib section 135. As a result, the material 3602 may have co-rotational cells but no auxetic effects.

Prior to deformation, for example, the first separation distance 3610 may measure approximately between 50 nm and 50 mm and the second separation distance 3615 may measure approximately between 50 nm and 50 mm. More specifically, the first separation distance 3610 may measure approximately 9.61 mm and the second separation distance 3615 may measure approximately 9.61 mm.

During the rotation of the chiral cell 3605 and the chiral shaped contiguous core cell 3600, the adjoining angles ϕ, ♀ may increase. Each of the adjoining angles ϕ, ♀ may increase until a maximum value of, for example, approximately 180°.

Figure 39:
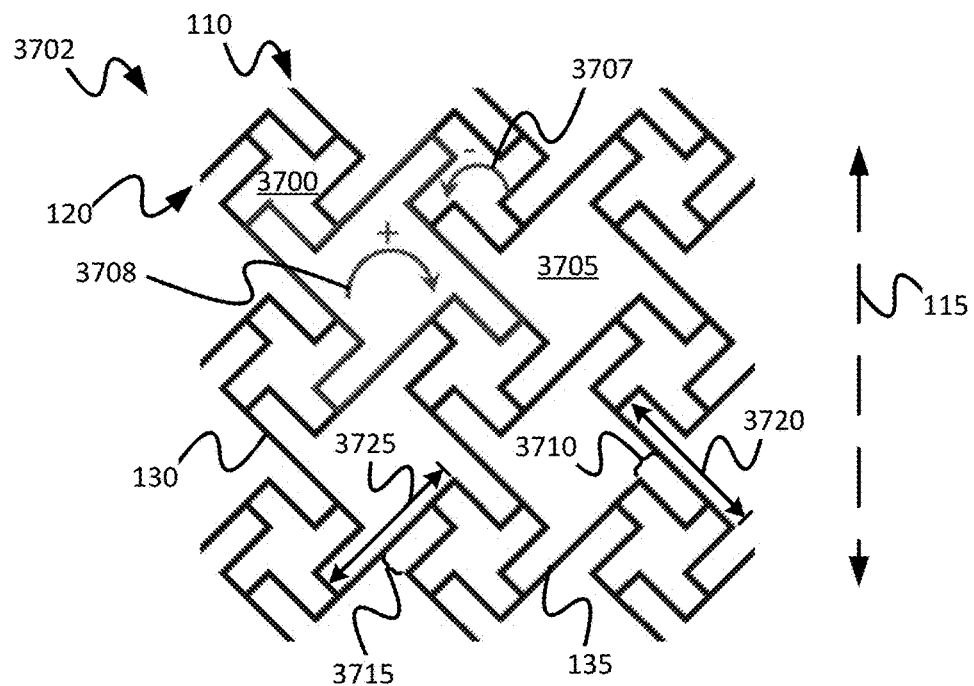
FIG. 39 shows another embodiment of the auxetic material of FIG. 1 having a chiral shaped contiguous core cell, consistent with embodiments of the present disclosure.

FIG. 39 shows an embodiment of an auxetic material 3702 having chiral shaped contiguous core cells 3700. As shown, the auxetic material 3702 includes a plurality of chiral cells 3705 that are defined by the first ribs 110, the second ribs 120, and at least four chiral shaped contiguous core cells 3700. However, unlike the material 3602 of FIG. 38, when a tensile force parallel to the longitudinal axis 115 is applied to the auxetic material 3702, the chiral cell 3705 and the chiral shaped contiguous core cell 3700 rotate in opposite directions, as is generally illustrated by directional arrows 3707, 3708. In other words, the auxetic material 3702 may generally be described as having counter rotational cells. The rotation of the chiral shaped contiguous core cell 3700 and the chiral cell 3705 is similar to the rotation of the auxetic structures 105 and the chiral cells 122, 610 of FIGS. 1-14. Accordingly, further discussion of the rotation of the chiral shaped contiguous core cell 3700 and the chiral cell 3705 is omitted for the sake of brevity.

The counter rotation of the chiral shaped contiguous core cell 3700 and the chiral cell 3705 may be influenced by a first separation distance 3710 between one of the first rib sections 130 and the chiral shaped contiguous core cell 3700 and/or a second separation distance 3715 between one of the second rib sections 135 and the chiral shaped contiguous core cell 3700. For example, the first separation distance 3710 may be less than a length 3720 of the first rib section 130 and the second separation distance 3715 may be less than a length 3725 of the second rib section 135. As a result, the auxetic material 3702 may have counter rotational cells.

Prior to deformation, for example, the first separation distance 3710 may measure approximately between 50 nm and 50 mm and the second separation distance 3715 may measure approximately between 50 nm and 50 mm. More specifically, the first separation distance 3710 may measure approximately 4.30 mm and the second separation distance 3715 may measure approximately 4.30 mm.

Figure 40:
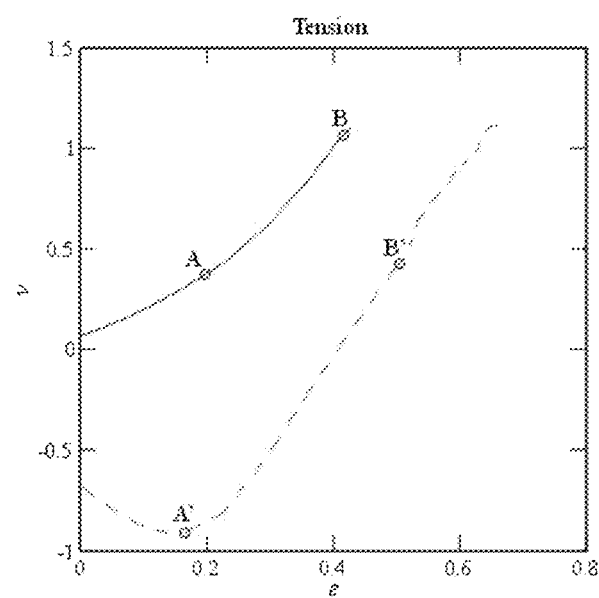
FIG. 40 is a plot of the Poison's ratio against tensile strain for the auxetic materials of FIGS. 38 and 39, consistent with embodiments of the present disclosure.
Figure 41A:
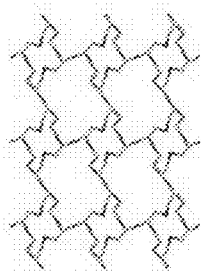
FIG. 41A is a representation of the deformation of the auxetic material of FIG. 38 at point A on the plot of FIG. 40, consistent with embodiments of the present disclosure.
Figure 41B:
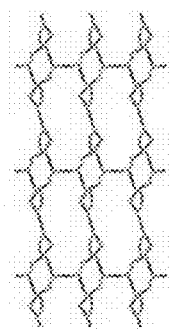
FIG. 41B is a representation of the deformation of the auxetic material of FIG. 38 at point B on the plot of FIG. 40, consistent with embodiments of the present disclosure.
Figure 42A:
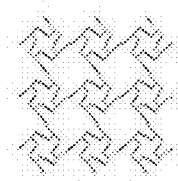
FIG. 42A is a representation of the deformation of the auxetic material of FIG. 39 at point A' on the plot of FIG. 40, consistent with embodiments of the present disclosure.
Figure 42B:
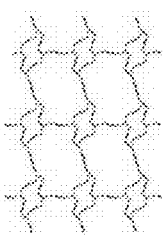
FIG. 42B is a representation of the deformation of the auxetic material of FIG. 39 at point B' on the plot of FIG. 40, consistent with embodiments of the present disclosure.

The plot of FIG. 40 plots the Poisson's ratio against tensile strain for the co-rotational material 3602 of FIG. 38 and for the counter rotational auxetic material 3702 of FIG. 39. The co-rotational material 3602 is illustrated as the solid line and the counter rotational auxetic material 3702 is illustrated as the broken line. As shown, the co-rotational material 3602 has an initial Poisson's ratio of approximately zero. With continued deformation, the Poisson's ratio continues to increase. As also shown, the counter rotational auxetic material 3702 has an initial Poisson's ratio of approximately −0.65. With continued deformation, the Poisson's ratio decreases to a minimum value of approximately −0.95 at approximately 20% deformation. After reaching the minimum value of approximately −0.95, the Poisson's ratio begins to increase with continued deformation, eventually becoming positive. Points A and B on the plot of FIG. 40 may generally correspond to the deformation of the co-rotational material 3602 as represented in FIGS. 41A and 41B respectively. Points A' and B' on the plot of FIG. 40 may generally correspond to the deformation of the counter rotational auxetic material 3702 as represented in FIGS. 42A and 42B, respectively.

Figure 43:
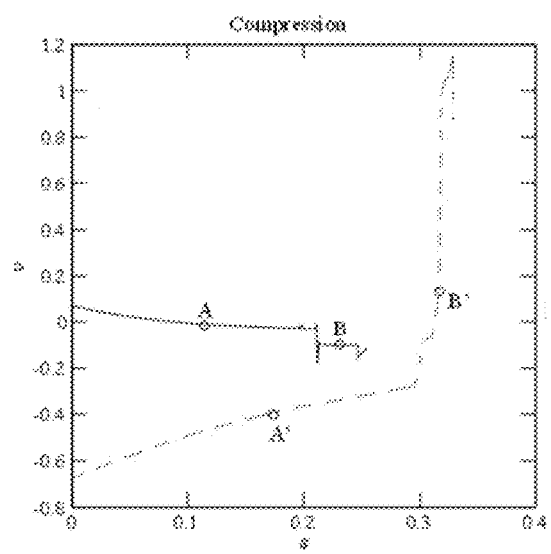
FIG. 43 is a plot of the Poison's ratio against compressive strain for the auxetic materials of FIGS. 38 and 39, consistent with embodiments of the present disclosure.

The plot of FIG. 43 plots the Poisson's ratio against compressive strain for the co-rotational material 3602 of FIG. 38 and for the counter rotational auxetic material 3702 of FIG. 39. The co-rotational material 3602 is illustrated as the solid line and the counter rotational auxetic material 3702 is illustrated as the broken line. As shown, the co-rotational material 3602 has an initial Poisson's ratio of approximately zero. With continued deformation, the Poisson's ratio decreases to a minimum value between about −0.1 and about −0.2 at approximately 20% deformation. In other words, the co-rotational material 3602 has a substantially stable Poisson's ratio (e.g., close to zero) as a result of the co-rotation of the cells. This stability may continue until the onset of cell densification. As also shown, for the counter rotational auxetic material 3702 the Poisson's ratio is approximately −0.65. With continued deformation, the Poisson's ratio increases to a value of approximately −0.3 at approximately 30% deformation. After 30% deformation, the Poisson's ratio begins to rapidly increase due to, for example, contact between ribs 110, 120 or densification.

Figure 44A:
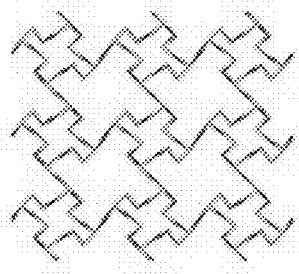
FIG. 44A is a representation of the deformation of the auxetic material of FIG. 38 at point A on the plot of FIG. 43, consistent with embodiments of the present disclosure.
Figure 44B:
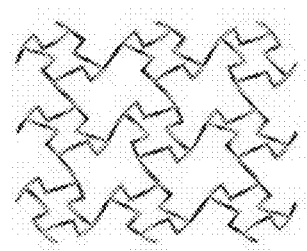
FIG. 44B is a representation of the deformation of the auxetic material of FIG. 38 at point B on the plot of FIG. 43, consistent with embodiments of the present disclosure.
Figure 45A:
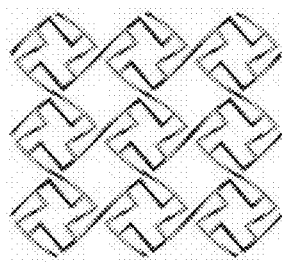
FIG. 45A is a representation of the deformation of the auxetic material of FIG. 39 at point A' on the plot of FIG. 43, consistent with embodiments of the present disclosure.
Figure 45B:
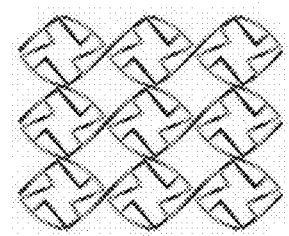
FIG. 45B is a representation of the deformation of the auxetic material of FIG. 39 at point B' on the plot of FIG. 43, consistent with embodiments of the present disclosure.

Points A and B on the plot of FIG. 43 may generally correspond to the deformation of the co-rotational material 3602 as represented in FIGS. 44A and 44B respectively. Points A' and B' on the plot of FIG. 43 may generally correspond to the deformation of the counter rotational auxetic material 3702 as represented in FIGS. 45A and 45B, respectively. FIG. 45A shows the counter rotational auxetic material 3702 before densification and/or contact between the ribs 110, 120 and FIG. 45B shows the counter rotational auxetic material 3702 after densification and/or contact between the ribs 110, 120.

Figure 46:
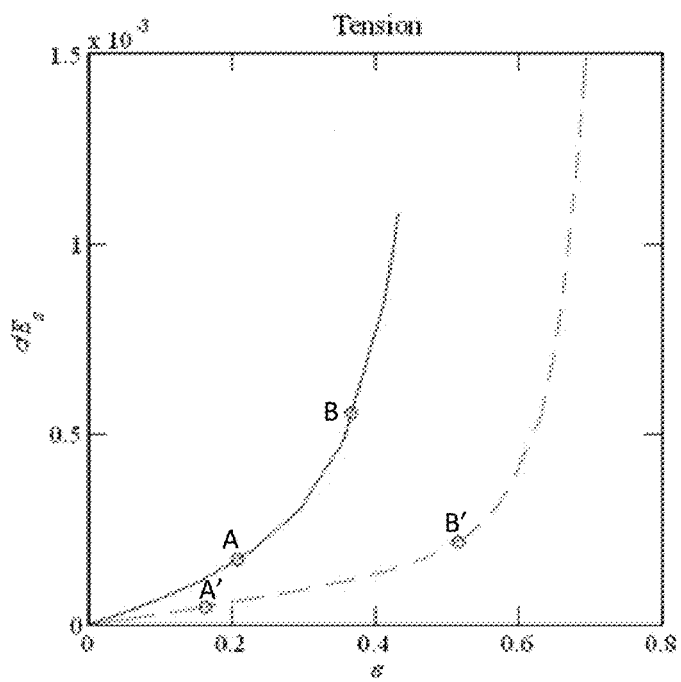
FIG. 46 is a plot of the non-dimensional stress against tensile strain for the auxetic materials of FIGS. 38 and 39, consistent with embodiments of the present disclosure.

The plot of FIG. 46 plots the non-dimensional stress against the tensile strain for the co-rotational material 3602 of FIG. 38 and for the counter rotational auxetic material 3702 of FIG. 39. The co-rotational material 3602 is illustrated as the solid line and the counter rotational auxetic material 3702 is illustrated as the broken line. As shown, the initial stiffness for the counter rotational auxetic material 3702 is approximately three times greater than the initial stiffness of the co-rotational material 3602. However, strain hardening occurs in the counter rotational material 3702 at approximately 30%, while for the co-rotational material 3602 strain hardening begins at approximately 50% deformation.

Figure 47A:
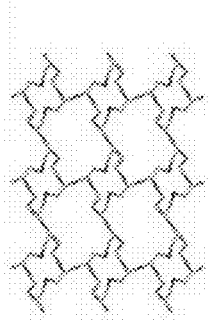
FIG. 47A is a representation of the deformation of the auxetic material of FIG. 38 at point A on the plot of FIG. 46, consistent with embodiments of the present disclosure.
Figure 47B:
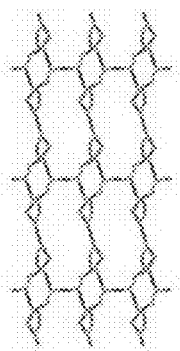
FIG. 47B is a representation of the deformation of the auxetic material of FIG. 38 at point B on the plot of FIG. 46, consistent with embodiments of the present disclosure.
Figure 48A:
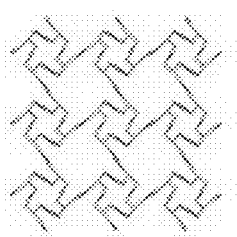
FIG. 48A is a representation of the deformation of the auxetic material of FIG. 39 at point A' on the plot of FIG. 46, consistent with embodiments of the present disclosure.
Figure 48B:
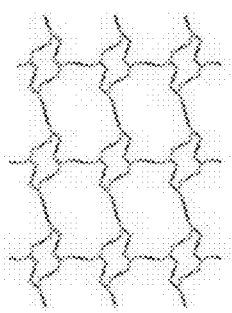
FIG. 48B is a representation of the deformation of the auxetic material of FIG. 39 at point B' on the plot of FIG. 46, consistent with embodiments of the present disclosure.

Points A and B on the plot of FIG. 46 may generally correspond to the deformation of the co-rotational material 3602 as represented in FIGS. 47A and 47B, respectively. Points A' and B' on the plot of FIG. 46 may generally correspond to the deformation of the counter rotational auxetic material 3702 as represented in FIGS. 48A and 48B, respectively.

Figure 49:
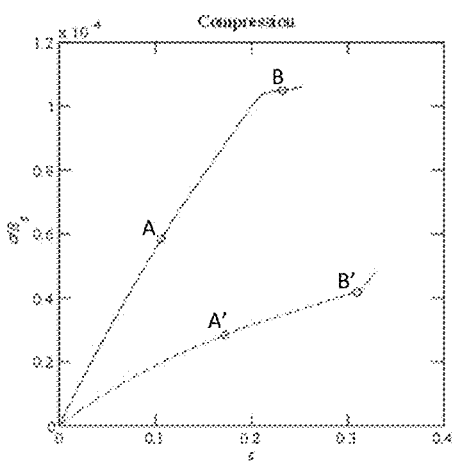
FIG. 49 is a plot of the non-dimensional stress against compressive strain for the auxetic materials of FIGS. 38 and 39, consistent with embodiments of the present disclosure.

The plot of FIG. 49 plots the non-dimensional stress against the compressive strain for the co-rotational auxetic material 3602 of FIG. 38 and for the counter rotational auxetic material 3702 of FIG. 39. The co-rotational material 3602 is illustrated as the solid line and the counter rotational auxetic material 3702 is illustrated as the broken line. For the co-rotational material 3602 instability occurs at about 20% deformation, while for the counter-rotational auxetic material 3702 no substantial buckling of the ribs 110, 120 was detected (buckling referring to the feature that the first rib 110 contacts at least one of the second rib 120 and/or contiguous core cell 3600, 3700). For the counter-rotational auxetic material 3702 strain hardening occurs at about 30% deformation due to densification.

Figure 50A:
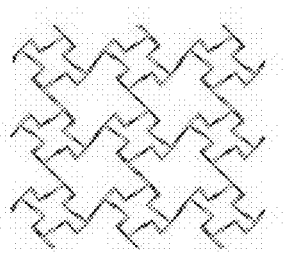
FIG. 50A is a representation of the deformation of the auxetic material of FIG. 38 at point A on the plot of FIG. 49, consistent with embodiments of the present disclosure.
Figure 50B:
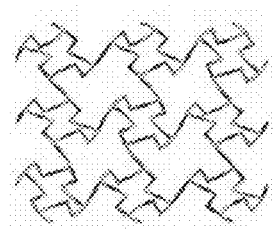
FIG. 50B is a representation of the deformation of the auxetic material of FIG. 38 at point B on the plot of FIG. 49, consistent with embodiments of the present disclosure.
Figure 51A:
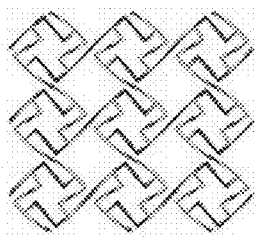
FIG. 51A is a representation of the deformation of the auxetic material of FIG. 39 at point A' on the plot of FIG. 49, consistent with embodiments of the present disclosure.
Figure 51B:
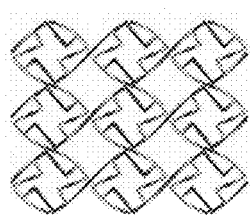
FIG. 51B is a representation of the deformation of the auxetic material of FIG. 39 at point B' on the plot of FIG. 49, consistent with embodiments of the present disclosure.

Points A and B on the plot of FIG. 49 may generally correspond to the deformation of the co-rotational material 3602 as represented in FIGS. 50A and 50B, respectively. Points A' and B' on the plot of FIG. 49 may generally correspond to the deformation of the counter rotational auxetic material 3702 as represented in FIGS. 51A and 51B, respectively.

Figure 52:
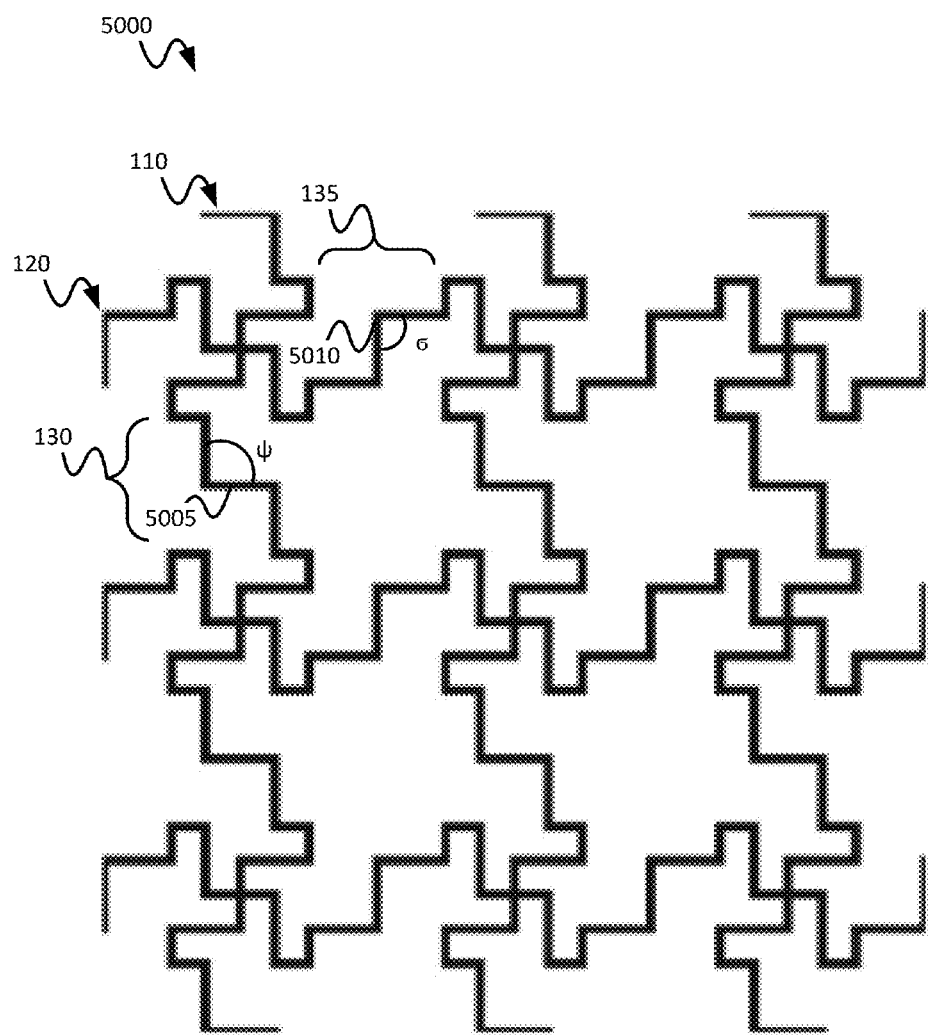
FIG. 52 is an embodiment of a second order hierarchal auxetic material, consistent with embodiments of the present disclosure.

As next shown in FIG. 52, the auxetic material 100 may be form an auxetic material 5000. The auxetic material 5000 includes a plurality of first ribs 110 and second ribs 120. Each first rib includes a plurality of adjoining first rib sections 130. Each first rib section 130 may be separated into at least two adjoining first sub-rib sections 5005. Each adjoining first sub-rib section 5005 forms a first sub-rib adjoining angle ψ. The first sub-rib adjoining angle ψ may be between 10° and 90°. More particularly, the first sub-rib adjoining angle ψ may be between 45° and 90°. Even more particularly, in some embodiments, the first sub-rib adjoining angle ψ may be 90°. Similarly, each second rib 120 may include a plurality of adjoining second rib sections 135. Each second rib section 135 may be separated into at least two adjoining second sub-rib sections 5010. Each adjoining second sub-rib section 5010 forms a second sub-rib adjoining angle σ. The second sub-rib adjoining angle σ may be between 10° and 90°. More particularly, the second sub-rib adjoining angle σ may be between 45° and 90°. Even more particularly, in some embodiments, the second sub-rib adjoining angle σ may be 90°. In other words, each substantially linear first rib and second rib section 130,135 of the auxetic material 100 of FIG. 1 includes at least one "zig-zag" shaped portion.

Figure 53A:
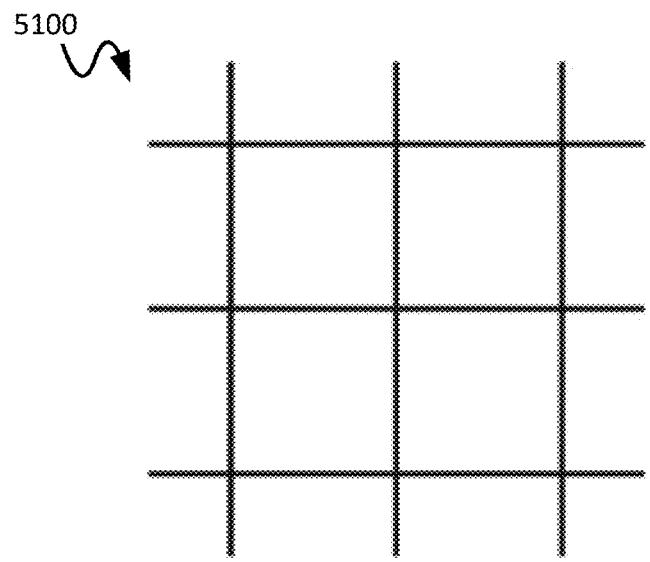
FIG. 53A is an embodiment of a zeroth order hierarchal material, consistent with embodiments of the present disclosure.
Figure 53B:
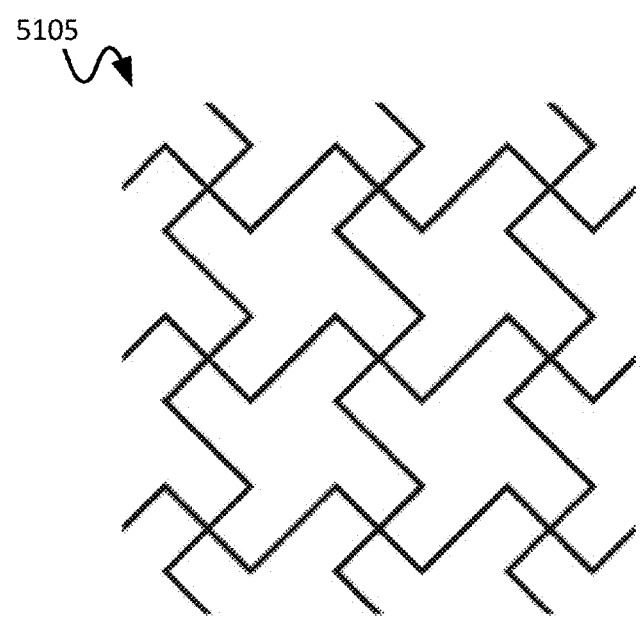
FIG. 53B is an embodiment of a first order hierarchal auxetic material, consistent with embodiments of the present disclosure.

Therefore, auxetic material 5000 may be considered a second order hierarchal structure, the auxetic material 100 of FIG. 1 may be considered a first order hierarchal structure, and a material wherein the first and second ribs 110,120 are substantially linear may be generally described as a zeroth order hierarchal structure. For example, when the substantially linear first and second ribs 110, 120 of the zeroth order hierarchal structure 5100 of FIG. 53A include "zig-zag" shaped portions, the first order hierarchal structure 5105 of FIG. 53B results. When the substantially linear rib sections 130,135 of the first order hierarchal structure 5105 of FIG. 53B include "zig-zag" shaped portions, the auxetic material 5000 (or a second order hierarchal structure) of FIG. 52 results. This process may be repeated to obtain a third order hierarchal structure, a fourth order hierarchal structure, and so on.

Figure 54:
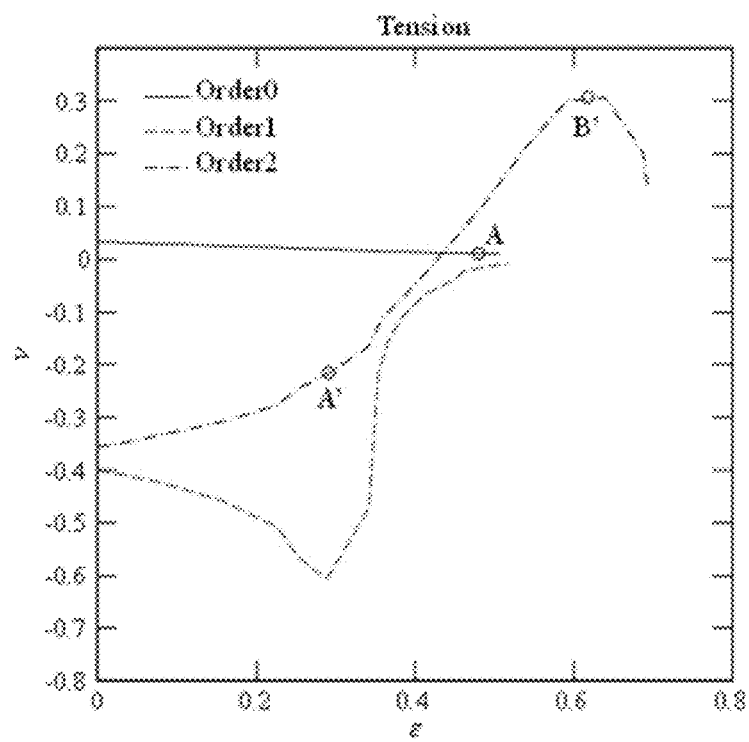
FIG. 54 is a plot of the Poison's ratio against tensile strain for the materials of FIGS. 52, 53A, and 53B, consistent with embodiments of the present disclosure.
Figure 55A:
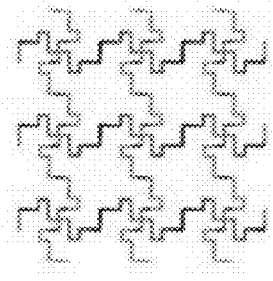
FIG. 55A is a representation of the deformation of the auxetic material of FIG. 52 at point A' on the plot of FIG. 54, consistent with embodiments of the present disclosure.
Figure 55B:
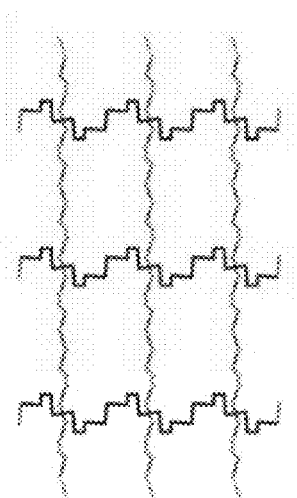
FIG. 55B is a representation of the deformation of the auxetic material of FIG. 52 at point B' on the plot of FIG. 54, consistent with embodiments of the present disclosure.

The plot of FIG. 54 plots the Poisson's ratio against tensile strain for each of the zeroth order hierarchal structure 5100, the first order hierarchal structure 5105, and the auxetic material 5000 (or a second order hierarchal structure). As shown, the zeroth order hierarchal structure 5100 has a Poisson's ratio of approximately zero that remains substantially unchanged during the deformation. The first order hierarchal structure 5105, on the other hand, has an initially negative Poisson's ratio of approximately −0.4 that decreases to approximately −0.6 at approximately 30% deformation. At deformations greater than 30% the Poisson's ratio approaches a value of zero. In some instances, the Poisson's ratio may asymptotically approach zero. As is also shown, for the auxetic material 5000, the Poisson's ratio is initially −0.35 and then progressively increases until reaching a maximum value at approximately 60% deformation. Points A' and B' on the plot of FIG. 54 may generally correspond to the deformation of the auxetic material 5000 as represented in FIGS. 55A and 55B, respectively.

Figure 56:
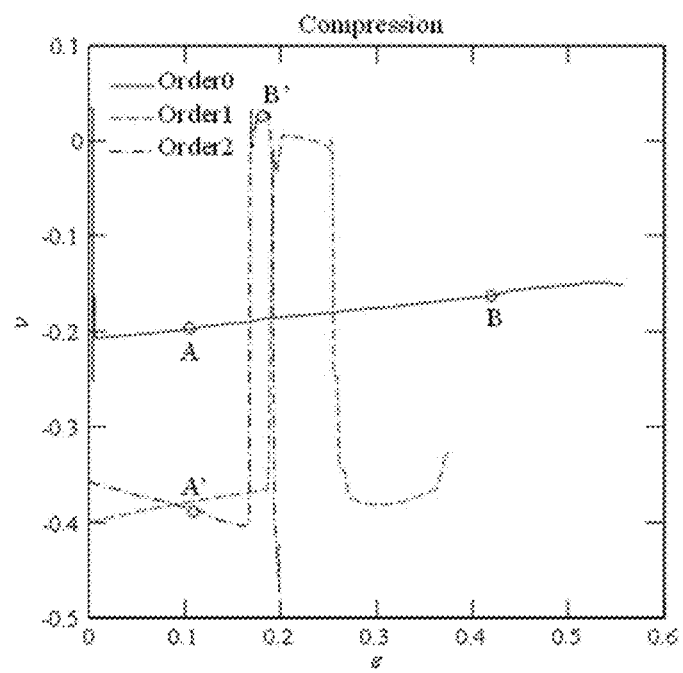
FIG. 56 is a plot of the Poison's ratio against compressive strain for the materials of FIGS. 52, 53A, and 53B, consistent with embodiments of the present disclosure.
Figure 57A:
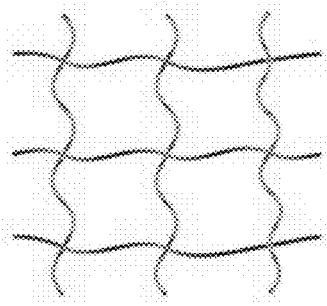
FIG. 57A is a representation of the deformation of the material of FIG. 53A at point A on the plot of FIG. 56, consistent with embodiments of the present disclosure.
Figure 57B:
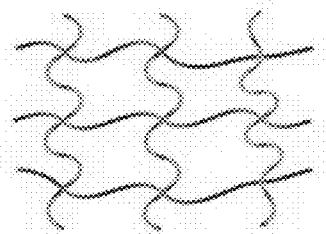
FIG. 57B is a representation of the deformation of the material of FIG. 53A at point B on the plot of FIG. 56, consistent with embodiments of the present disclosure.
Figure 58A:
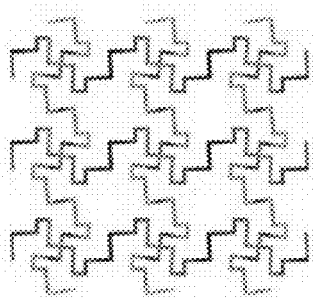
FIG. 58A is a representation of the deformation of the material of FIG. 52 at point A' on the plot of FIG. 56, consistent with embodiments of the present disclosure.
Figure 58B:
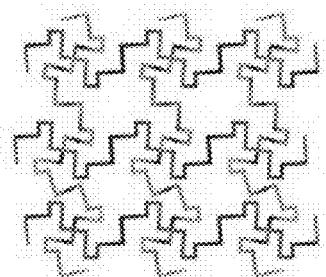
FIG. 58B is a representation of the deformation of the material of FIG. 52 at point B' on the plot of FIG. 56, consistent with embodiments of the present disclosure.

The plot of FIG. 56 plots the Poisson's ratio against compressive strain for each of the zeroth order hierarchal structure 5100, the first order hierarchal structure 5105, and the auxetic material 5000 (or a second order hierarchal structure). As shown, the zeroth order hierarchal structure 5100 has an initial Poisson's ratio of approximately 0. However, with increased deformation, the structure begins to lose stability and buckle. After buckling occurs, the Poisson's ratio decreases to approximately −0.2 and remains substantially at that value for a significant amount of deformation. As shown, the auxetic material 5000 has an initial Poisson's ratio of approximately −0.35 that initially decreases to approximately −0.4 before increasing to a value of approximately 0. After reaching a value of approximately 0, the Poisson's ratio then begins to decrease. Points A and B on the plot of FIG. 56 may generally correspond to the deformation of the zeroth order hierarchal structure 5100 as represented in FIGS. 57A and 57B, respectively. Point A' and B' on the plot of FIG. 56 may generally correspond to the deformation of the auxetic material 5000 as represented in FIGS. 58A and 58B, respectively.

Figure 59:
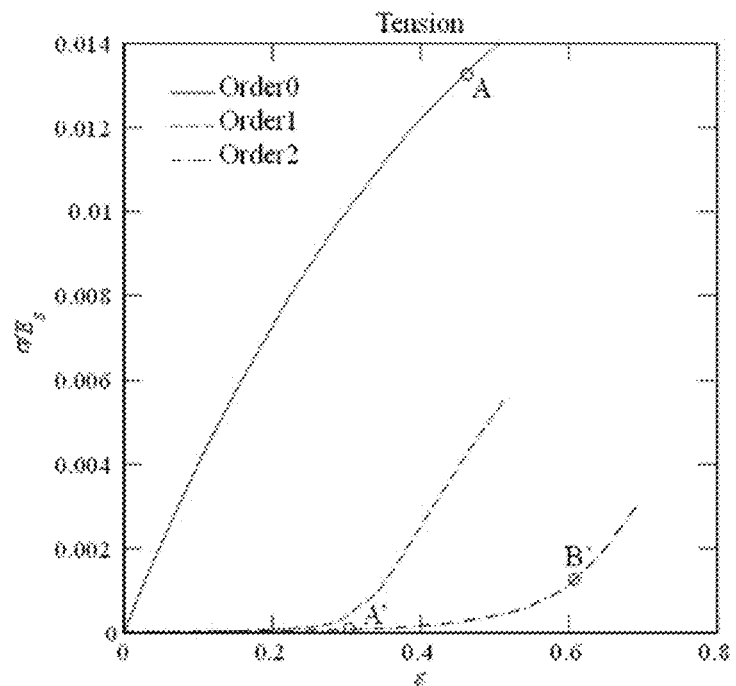
FIG. 59 is a plot of the non-dimensional stress against tensile strain for the materials of FIGS. 52, 53A, and 53B, consistent with embodiments of the present disclosure.
Figure 60A:
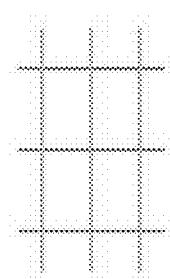
FIG. 60A is a representation of the deformation of the material of FIG. 53A at point A on the plot of FIG. 59, consistent with embodiments of the present disclosure.
Figure 61A:
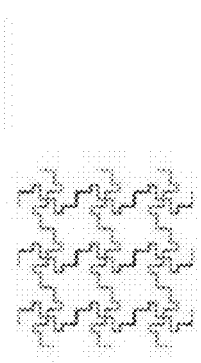
FIG. 61A is a representation of the deformation of the material of FIG. 52 at point A' on the plot of FIG. 59, consistent with embodiments of the present disclosure.
Figure 61B:
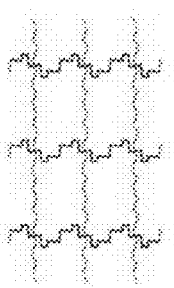
FIG. 61B is a representation of the deformation of the material of FIG. 52 at point B' on the plot of FIG. 59, consistent with embodiments of the present disclosure.

The plot of FIG. 59 plots the non-dimensional stress against tensile strain for each of the zeroth order hierarchal structure 5100, the first order hierarchal structure 5105, and the auxetic material 5000 (or a second order hierarchal structure). As shown, the stress-strain curve for the zeroth order hierarchal structure 5100 is substantially linear for large deformations. For the first order hierarchal structure 5105 and the auxetic material 5000 the stress-strain curves are initially substantially linear, however, as the first ribs 120 become more linear strain hardening occurs, resulting in a change in the stress-strain curve. Generally, the initial stiffness decreases with increasing hierarchal order and the strain at which hardening occurs increases with increasing hierarchal order. Point A on the plot of FIG. 59 may generally correspond to the deformation of the zeroth order hierarchal structure 5100 as represented in FIG. 60A. Point A' and B' on the plot of FIG. 59 may generally correspond to the deformation of the auxetic material 5000 as represented in FIGS. 61A and 61B, respectively.

Figure 62:
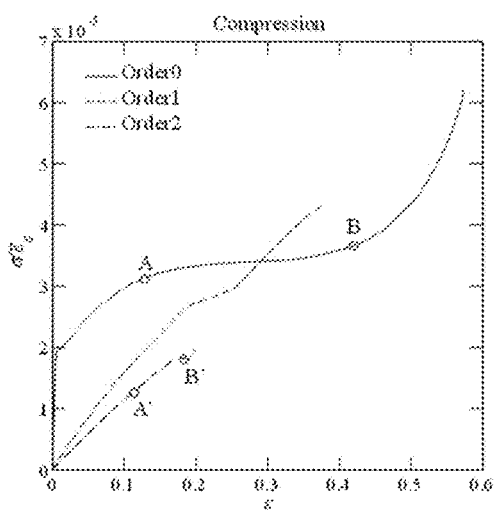
FIG. 62 is a plot of the non-dimensional stress against compressive strain for the materials of FIGS. 52, 53A, and 53B, consistent with embodiments of the present disclosure.
Figure 63A:
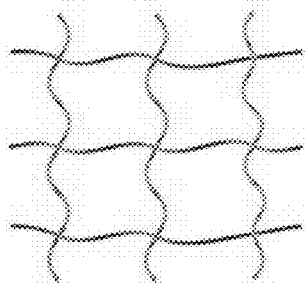
FIG. 63A is a representation of the deformation of the material of FIG. 53A at point A on the plot of FIG. 62, consistent with embodiments of the present disclosure.
Figure 63B:
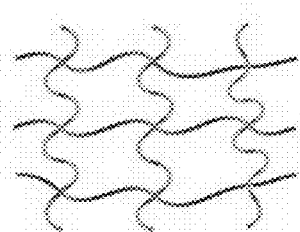
FIG. 63B is a representation of the deformation of the material of FIG. 53A at point B on the plot of FIG. 62, consistent with embodiments of the present disclosure.
Figure 64A:
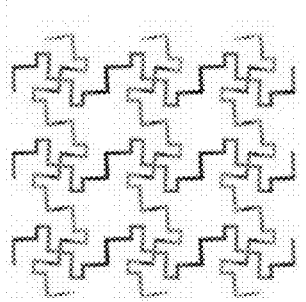
FIG. 64A is a representation of the deformation of the material of FIG. 52 at point A' on the plot of FIG. 62, consistent with embodiments of the present disclosure.
Figure 64B:
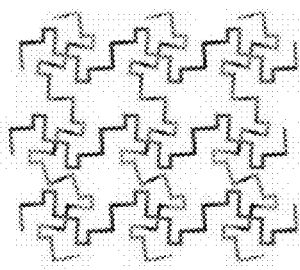
FIG. 64B is a representation of the deformation of the material of FIG. 52 at point B' on the plot of FIG. 62, consistent with embodiments of the present disclosure.

The plot of FIG. 62 plots the non-dimensional stress against compressive strain for each of the zeroth order hierarchal structure 5100, the first order hierarchal structure 5105, and the auxetic material 5000 (or a second order hierarchal structure). As shown, as the hierarchal order increases, the initial stiffness decreases. Further, with increasing hierarchal order, the densification of the material occurs at lower strain values. Points A and B on the plot of FIG. 62 may generally correspond to the deformation of the zeroth order hierarchal structure 5100 as represented in FIGS. 63A and 63B, respectively. Points A' and B' on the plot of FIG. 62 may generally correspond to the deformation of the auxetic material 5000 as represented in FIGS. 64A and 64B, respectively.

In one example, the auxetic materials disclosed herein can be used in a drug delivery system 6501. For example, as shown in FIG. 65A a chiral cell 6500 and a contiguous core cell 6505 may each contain a respective drug 6510, 6515. As shown in FIG. 65B, as the chiral cell 6500 initially begins to expand due to an applied force, only the drug 6510 is initially released due to the expansion of the chiral cell 6500. As shown in FIG. 65C, with the continued expansion of the chiral cell 6500, the contiguous core cell 6505 begins to expand and the drug 6515 is then released from the contiguous core cell 6505. As a result, the drug delivery system 6501 is capable of releasing at least two different drugs at two or more different times. In one example, the drug delivery system 6501 may be incorporated into a bandage or cast that is in contact with an individual having an injury. A swelling of the injury causes a force to be exerted on the bandage or cast, resulting in a force being exerted on the auxetic materials of the drug delivery system 6501. As a result, at least one of the chiral cell 6500 or the contiguous core cell 6505 expands, releasing at least one of the drugs 6510, 6515. The bandage and/or cast may include a polymer or an elastic alloy.

In another example, the auxetic materials disclosed herein can be used as a tool-less fastener 6600. In other words, the fastener 6600 may be coupled to an object by a user without requiring the user to utilize a specialized tool (e.g., a hammer, a screw driver, a wrench, etc.). For example, as shown in FIGS. 66A and 66B, the tool-less fastener 6600 may be used to couple a first material 6605 to a second material 6610. The tool-less fastener 6600 is exposed to a compressive force when inserted into an opening 6615 extending through the first material and the second material 6605, 6610. As a result, the auxetic material of the tool-less fastener 6600 narrows such that the tool-less fastener can be inserted into the opening 6615. When the compressive force is removed, the tool-less fastener 6600 expands within the opening forming a press-fit. Reapplication of a compressive force causes the tool-less fastener 6600 to narrow such that the tool-less fastener 6600 can be removed.

Figure 67A:
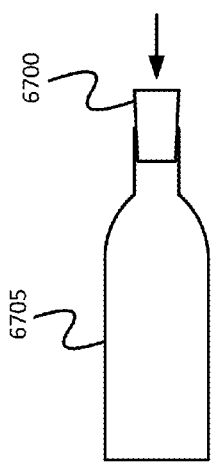
FIG. 67A shows a cross-section of an example of a tool-less fastener including an auxetic material for sealing a bottle, consistent with embodiments of the present disclosure.
Figure 67B:
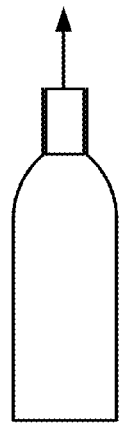
FIG. 67B shows a cross-section of an example of the tool-less fastener of FIG. 67A being inserted into a bottle, consistent with embodiments of the present disclosure.
Figure 67F:
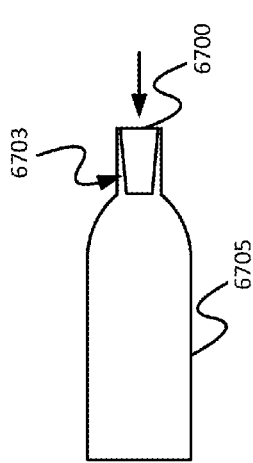
FIG. 67F shows a cross-section of an example of the tool-less fastener of FIG. 67A being removed from a bottle, consistent with embodiments of the present disclosure.
Figure 67C:
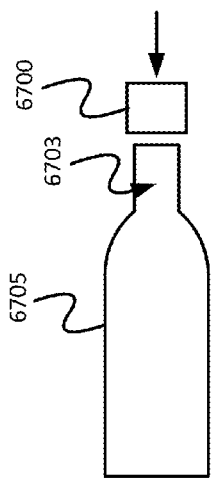
FIG. 67C shows a cross-section of an example of the tool-less fastener of FIG. 67A inserted in a bottle, consistent with embodiments of the present disclosure.
Figure 67D:
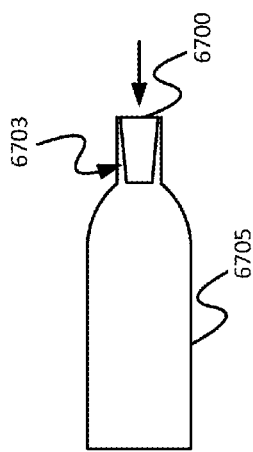
FIG. 67D shows a cross-section of an example of the tool-less fastener of FIG. 67A being exposed to a tensile force, consistent with embodiments of the present disclosure.

FIGS. 67A-67G show another example of a tool-less fastener 6700 that may be used as a cork for a bottle. As shown in FIGS. 67A and 67B due to the tool-less fastener 6700 including an auxetic material, when the tool-less fastener 6700 is compressed into an opening 6703 of a bottle 6705, the tool-less fastener 6700 narrows. As shown in FIG. 67C when the compressive force is removed, the tool-less fastener 6700 expands in the bottle 6705, forming a press-fit. As shown in FIG. 67D, application of tensile force to tool-less fastener 6700 does not result in the removal of the tool-less fastener 6700. Instead, application of a tensile force to the tool-less fastener 6700 causes the tool-less fastener

Figure 67E:
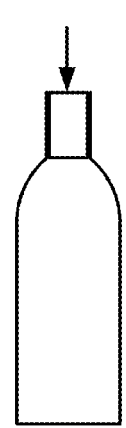
FIG. 67E shows a cross-section of an example of the tool-less fastener of FIG. 67A being exposed to a compressive force, consistent with embodiments of the present disclosure
Figure 67G:
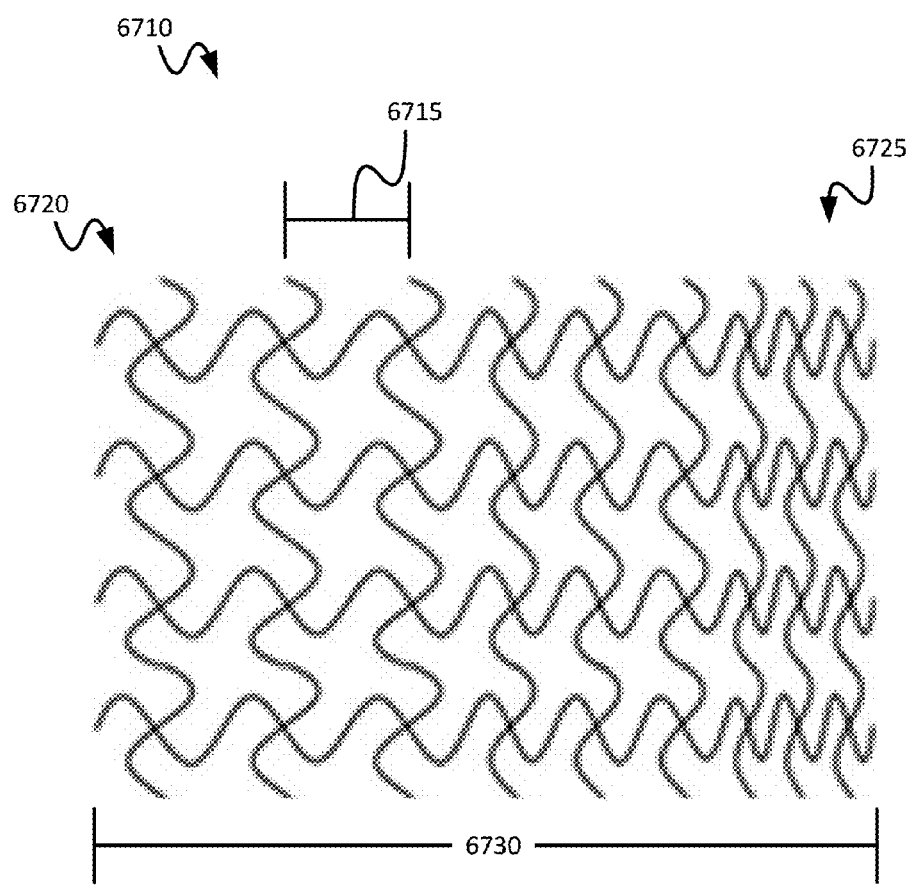
FIG. 67G shows an example of an auxetic material that may be used, for example, in the tool-less fastener of FIG. 67A.

6700 to expand, preventing the removal of the tool-less fastener 6700 from the opening 6703 of the bottle 6705. FIGS. 67E and 67F illustrate the process of removing the tool-less fastener 6700. As shown, to remove the tool-less fastener 6700, a compressive force is applied to the tool-less fastener 6700 until the auxetic material yields, resulting in the deformation becoming permanent such that the size of the tool-less fastener 6700 is less than that of the opening 6703. For example, application of a compressive strain of about 18%. In some instances, the auxetic structure forming the tool-less fastener 6700 may be designed such that as the tool-less fastener 6700 is inserted into the bottle 6705, the tool-less fastener 6700 develops a conical shape. This may occur should one provide in the tool-less fastener 6700 an auxetic material that shows a relatively greater negative Poisson's ratio on one end versus the other end. This can be accomplished, e.g., by progressively reducing the separation distance 615 on one end versus the other. Accordingly, the auxetic material forming the tool-less fastener 6700 may have a geometry similar to an auxetic material 6710 as shown in FIG. 67G. As shown, the auxetic material 6710 has a separation distance 6715 between the ribs that progressively changes between a first end 6720 and a second end 6725 of the auxetic material 6710. In other words, the auxetic material 6710 may become progressively more dense along a length 6730 of the auxetic material 6710.

FIGS. 68A to 68D show an example of a fastening system 6800 that may include an auxetic component 6805 and a non-auxetic component 6810. The auxetic component 6805 includes at least one opening and/or channel 6815 and the non-auxetic component 6810 includes at least one protrusion 6820. The opening and/or channel 6815 may have an opening width 6825 that is less than a protrusion width 6830. Therefore, as shown in FIG. 68A, when a compressive force is applied to the fastening system 6800, the opening and/or channel 6815 expands such that the protrusion 6820 can be received within the opening and/or channel 6815. As shown in FIG. 68B, when the compressive force is removed, the opening and/or channel 6815 contracts, forming a press-fit with the protrusion 6820. As shown in FIG. 68C, to separate the auxetic component 6805 from the non-auxetic component 6810 a compressive force may be applied such that the opening and/or channel 6815 expands. Therefore, the fastening system 6800 may allow the auxetic component 6805 and the non-auxetic component 6810 to be coupled and uncoupled from each other repetitively. In other embodiments, the auxetic component 6805 may include the at least one protrusion 6820 and the non-auxetic component 6810 may include one or more openings and/or channels 6815.

While the above disclosure primarily describes a tensile/compressive force being exerted generally parallel to the longitudinal axis, it should be appreciated that the tensile/compressive force does not need to be exerted parallel to the longitudinal axis to obtain a negative Poisson's ratio. For example, the tensile/compressive force may be exerted parallel to the transverse axis.

Further, while the above disclosure refers to the rib sections separately, it should be understood that the first and second rib can be formed from a continuous structure. The discussion of rib sections individually is for the purposes of clarity and not limitation.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An auxetic structure having a longitudinal and transverse axis comprising:
    a core cell;
    a plurality of first rib sections transverse to the longitudinal axis of the auxetic structure, wherein at least one of the first rib sections extends from the core cell; and
    a plurality of second rib sections transverse to the transverse axis of the auxetic structure, wherein at least one of the second rib sections extends from the core cell.

2. The auxetic structure of claim 1, wherein the plurality of first rib sections define at least a portion of a first rib that extends along the longitudinal axis of the auxetic structure and the plurality of second rib sections define at least a portion of a second rib that extends along the transverse axis of the auxetic structure.

3. The auxetic structure of claim 1, wherein the core cell includes at least a first concave region and a second concave region, the first concave region being opposite the second concave region.

4. The auxetic structure of claim 3, wherein the core cell includes at least a first substantially planar portion and a second substantially planar portion, the first substantially planar portion being opposite the second substantially planar portion.

5. The auxetic structure of claim 4, wherein the core cell is bow-tie shaped.

6. The auxetic structure of claim 4, wherein an elastic modulus for the first and second substantially planar portions is different from an elastic modulus for the first and second concave regions.

7. The auxetic structure of claim 3, wherein the core cell includes at least a third concave region and a fourth concave region, the third concave region being opposite the fourth concave region.

8. The auxetic structure of claim 7, wherein the core cell is star shaped.

9. The auxetic structure of claim 7, wherein an elastic modulus for the first and second concave regions is different from an elastic modulus of the third and fourth concave regions.

10. The auxetic structure of claim 1, wherein the core cell is a square or rectangular shape.

11. The auxetic structure of claim 10, wherein at least one of the plurality of first and second rib sections is enclosed within the square or rectangular shaped core cell.

12. An auxetic material having a longitudinal and transverse axis comprising:
    at least four auxetic structures, the auxetic structures collectively defining at least one chiral cell within the auxetic material, wherein each of the at least four auxetic structures include:
        a core cell;
        a plurality of first rib sections extending from the core cell, the first rib sections being transverse to the longitudinal axis of the auxetic structure; and
        a plurality of second rib sections extending from the core cell, the second rib sections being transverse to the transverse axis of the auxetic structure, wherein the plurality of first rib sections define at least a portion of a first rib that extends along the longitudinal axis of the auxetic structure and the plurality of second rib sections define at least a portion of a second rib that extends along the transverse axis of the auxetic structure.

13. The auxetic material of claim 12, wherein when the auxetic material is exposed to a force parallel to the longitudinal axis, the core cell and the chiral cell rotate in a opposite directions.

14. An auxetic structure having a longitudinal and transverse axis comprising:
- a core cell having at least a first concave region and a second concave region, the first concave region being opposite the second concave region;
- a plurality of first rib sections extending from the core cell, the first rib sections being transverse to the longitudinal axis of the auxetic structure; and
- a plurality of second rib sections extending from the core cell, the second rib sections being transverse to the transverse axis of the auxetic structure.

15. The auxetic structure of claim 14 further comprising a third concave region adjacent the first and second concave regions and a fourth concave region opposite the third concave region and adjacent to the first and second concave regions.

16. The auxetic structure of claim 15, wherein the first and second concave regions have an elastic modulus different from the third and fourth concave regions.

17. The auxetic structure of claim 14 further comprising a first substantially planar portion adjacent the first and second concave regions and a second substantially planar portion opposite the first substantially planar portion and adjacent to the first and second concave regions.

18. The auxetic structure of claim 17, wherein the first and second substantially planar portions have an elastic modulus different from the first and second concave regions.

* * * * *